(12) United States Patent
Matsuoka et al.

(10) Patent No.: US 6,371,089 B1
(45) Date of Patent: Apr. 16, 2002

(54) DIAGNOSTIC APPARATUS AND METHOD OF FUEL VAPOR PURGE SYSTEM

(75) Inventors: Takuya Matsuoka; Mamoru Yoshioka, both of Susono; Yoshihiko Hyoudou, Gotenba; Naoya Takagi, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/696,025

(22) Filed: Oct. 26, 2000

(30) Foreign Application Priority Data

Nov. 2, 1999 (JP) ............................ 11-312707
May 10, 2000 (JP) ....................... 2000-137881

(51) Int. Cl.[7] ................................................ F02M 37/04
(52) U.S. Cl. ......................................... 123/519; 123/520
(58) Field of Search ............................... 123/516, 518, 123/519, 520, 198 D; 73/118.1

(56) References Cited

U.S. PATENT DOCUMENTS

| 5,174,265 A | * | 12/1992 | Sekine | 123/520 |
| 5,245,973 A | * | 9/1993 | Otsuka et al. | 123/518 |
| 5,443,051 A | * | 8/1995 | Otsuka | 123/520 |
| 5,845,625 A | * | 12/1998 | Kidokoro et al. | 123/520 |
| 5,925,817 A | | 7/1999 | Kidokoro et al. | 73/40 |
| 5,975,062 A | * | 11/1999 | Bonse et al. | 123/519 |
| 6,073,487 A | * | 6/2000 | Dawson | 73/118.1 |

* cited by examiner

Primary Examiner—Thomas N. Moulis
(74) Attorney, Agent, or Firm—Kenyon & Kenyon

(57) ABSTRACT

A fuel vapor purge system has a canister for adsorbing fuel vapor from a fuel tank, a bypass passage bypassing the canister, and a bypass valve for controlling the state of connection of the bypass passage to a purge passage. The bypass passage is provided with a venturi so that the flow passage resistance of the bypass passage is normally greater than the flow passage resistance of the canister. The amount of flow of gas from an air chamber to an intake passage changes in accordance with the flow passage resistance of the passage. In this case, the tank internal pressure in the air chamber converges to a value corresponding to the flow passage resistance of the passage between the air chamber and the intake passage. Therefore, based on the tank internal pressure occurring before and after the supply of a drive signal to the bypass valve, it is determined whether the bypass passage has a clogged abnormality and whether the bypass valve has a fixation abnormality.

18 Claims, 10 Drawing Sheets

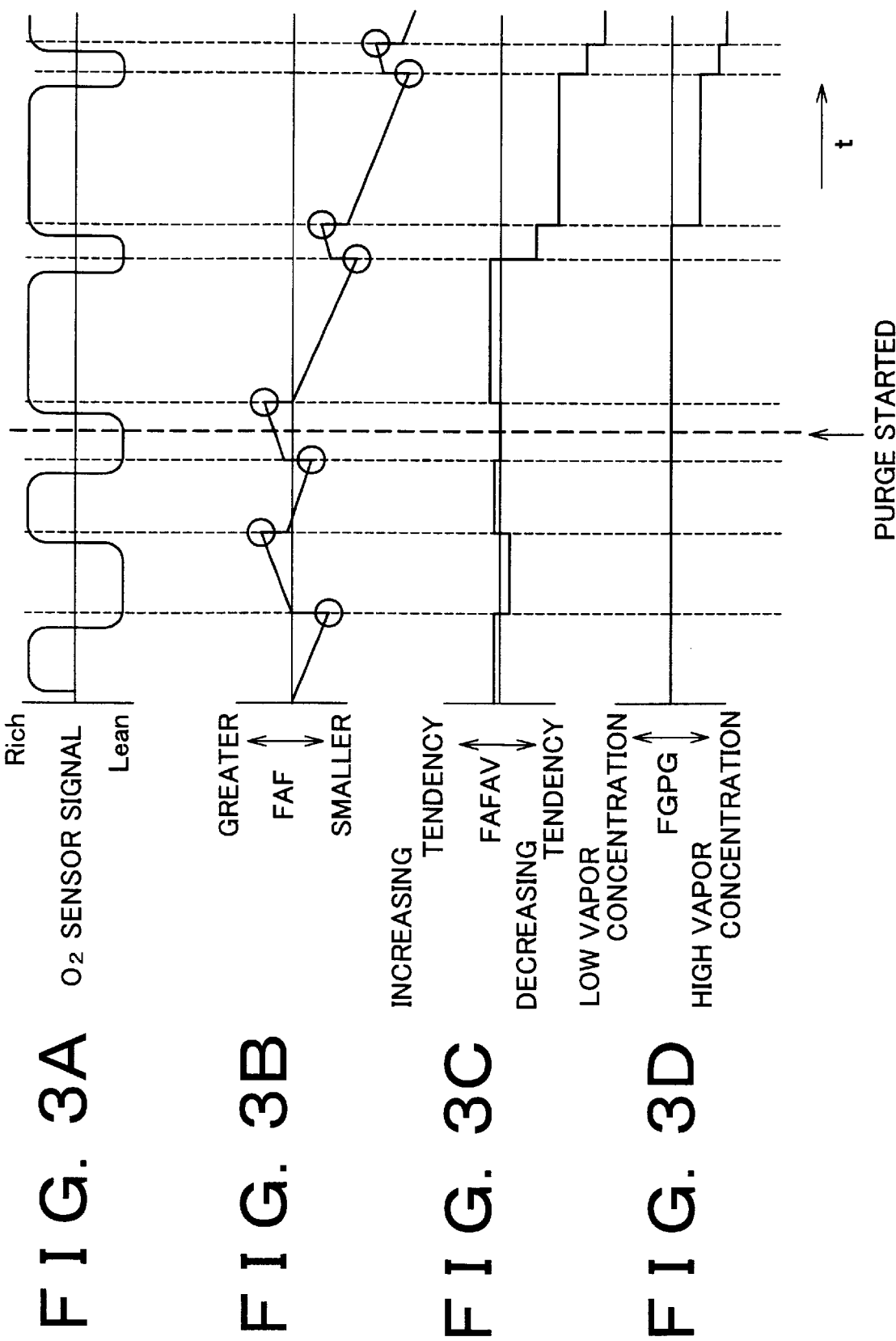

FIG. 4A PURGE VSV
FIG. 4B BYPASS VSV

PURGE FLOW 0.08 [x/sec]

BLADDER DIAPHRAGM HOLE DETECTION EXECUTION FLAG — OFF / ON

BYPASS VSV — OFF / ON

PASSAGE INTERNAL PRESSURE $P_{BP}$ [mmHg]

BYPASS VSV CLOSED FIXATION

BYPASS VSV NORMAL $\Delta P_{BP}$ [mmHg]

BYPASS VSV CLOSED FIXATION

BYPASS VSV NORMAL t20  t21  t22 t23

DIAGNOSTIC APPARATUS AND METHOD OF FUEL VAPOR PURGE SYSTEM

INCORPORATION BY REFERENCE

The disclosures of Japanese Patent Application Nos. HEI 11-312707 filed on Nov. 2, 1999 and 2000-137881 filed on May 10, 2000, including the specifications, drawings and abstracts are incorporated herein by reference in their entirety.

BACKGROUND OF THE INVENTION

1. Field of the Invention

The present invention relates to an apparatus and a method for diagnosing an abnormality in a fuel vapor purge system that purges fuel vapor that has been evaporated from a fuel tank and has been adsorbed to a canister into an intake passage of an internal combustion engine. More particularly, the invention relates to an abnormality diagnostic apparatus and method of a fuel vapor purge system that has a changing means for changing a communication passage connecting the fuel tank and the intake passage between a main passage in communication with the canister and a bypass passage that bypasses the canister.

2. Description of the Related Art

A known fuel vapor process apparatus that purges fuel vapor occurring in a fuel tank into an intake passage to prevent emission of fuel vapor from the fuel tank into the atmosphere is disclosed in, for example, Japanese Patent Application Laid-Open No. HEI 10-184464. The fuel tank has a deformable partition film that separates an internal space of the fuel tank into a fuel chamber and an air chamber in a tightly closed fashion in order to reduce occurrence of fuel vapor. The fuel vapor process apparatus has a canister for adsorbing fuel vapor from the fuel tank, and a purge control valve for controlling the open/close state between the canister and the intake passage. When the purge control valve of this apparatus is opened during operation of the internal combustion engine, negative pressure from the intake passage is introduced into the canister. In this case, therefore, air flows from the fuel tank toward the intake passage, so that fuel adsorbed in the canister is purged toward the intake passage. Hence, the above-described fuel vapor process apparatus is able to supply fuel vapor occurring in the fuel tank into the intake passage of the engine as a fuel without letting it out into the atmosphere.

However, if a hole is formed in the partition film of the fuel tank, fuel leaks into the air chamber, so that a portion of the fuel vapor may escape into the atmosphere. Therefore, in the fuel tank equipped with the partition film, it is necessary to detect whether the partition film has a hole.

The concentration of fuel vapor in the air chamber is low when the partition film has no hole. If a hole is formed in the partition film, the fuel vapor concentration in the air chamber increases. Therefore, as a technique for diagnosing whether the partition film has a hole, it is conceivable to stop purging fuel from the canister into the intake passage, and purge gas from the air chamber directly into the intake passage, and detect the concentration of gas occurring at the time of purge from the air chamber (hereinafter, referred to as "vapor concentration"). By this technique, it becomes possible to determine that the partition film has a hole if the vapor concentration is relatively high, and to determine that the partition film has no hole if the vapor concentration is relatively low.

If the aforementioned technique is used to determine whether the partition film has a hole, it is necessary to provide a bypass passage between the fuel tank and the intake passage for bypassing the canister, and a change valve that changes between a state of communication between the fuel tank and the intake passage via the canister and a state of communication therebetween via the bypass passage. Hereinafter, the bypass passage and the change valve may be collectively referred to as "bypass system" if necessary.

In the above-described construction, however, if the change valve is held in either one of the states for a long time, carbon likely deposits on and around movable portions of the change valve, so that the bypass passage may suffer a clogged abnormality, or a fixation abnormality in which the change valve cannot change the state of communication. If such an abnormality occurs in the bypass system, gas is not properly purged from the fuel tank into the intake passage, so that it becomes impossible to precisely detect whether there is a hole in the partition film. Therefore, in the above-described construction, it is necessary to determine whether the bypass system has an abnormality.

SUMMARY OF THE INVENTION

It is an object of the invention to provide an abnormality diagnostic apparatus and method of a fuel vapor purge system that is capable of determining whether the bypass system has an abnormality.

An abnormality diagnostic apparatus of a fuel vapor purge system in accordance with a first aspect of the invention includes a fuel tank connectable in communication to the atmosphere, a main passage connecting the fuel tank and an intake passage of an internal combustion engine via a canister for adsorbing a fuel vapor from the fuel tank, a bypass passage connecting the fuel tank and the intake passage, bypassing the canister, changing means for selectively changing a communication passage between the fuel tank and the intake passage between the main passage and the bypass passage, pressure detecting means for detecting a pressure in the fuel tank, and abnormality determining means for determining whether there is an abnormality in at least one of the bypass passage and the changing means based on the pressure detected by the pressure detecting means before and after an operation of changing between the main passage and the bypass passage is performed while air is flowing from the fuel tank toward the intake passage.

In this aspect, the flow passage resistance to gas differs between when gas from the fuel tank flows toward the intake passage through the canister and when gas from the fuel tank flows toward the intake passage, bypassing the canister. Since the fuel tank communicates with the atmosphere, the internal pressure in the fuel tank converges to a value close to the atmospheric pressure if the flow passage resistance to gas flowing from the fuel tank to the intake passage is great. If that flow passage resistance is small, the internal pressure in the fuel tank converges to a value that is remote from the atmospheric pressure.

If the bypass passage is clogged under a condition that the fuel tank and the intake passage are connected in communication via the bypass passage, the flow passage resistance becomes great, so that the internal pressure in the fuel tank converges to a value near the atmospheric pressure. If the changing means has an abnormality, the internal pressure in the fuel tank hardly changes before and after the operation of changing the communication passage is performed by the changing means. Conversely, if neither the bypass passage nor the changing means has an abnormality, the internal pressure in the fuel tank converges to one of two different values that corresponds to the currently selected passage, because the bypass passage and the main passage have different flow passage resistances. Therefore, by detecting the pressures in the fuel tank before and after the operation of changing the communication passage is performed by the changing means in a condition where air is flowing from the fuel tank to the intake passage, it becomes possible to determine whether there is an abnormality in the bypass passage or the changing means.

An abnormality diagnostic apparatus of a fuel vapor purge system in accordance with a second aspect of the invention includes a fuel tank connectable in communication to an atmosphere, a main passage connecting the fuel tank and an intake passage of an internal combustion engine via a canister for adsorbing a fuel vapor from the fuel tank, a bypass passage connecting the fuel tank and the intake passage, bypassing the canister, changing means for selectively changing a communication passage between the fuel tank and the intake passage between the main passage and the bypass passage, pressure detecting means for detecting a pressure in the bypass passage, and abnormality determining means for determining whether there is an abnormality in at least one of the bypass passage and the changing means based on the pressure detected by the pressure detecting means before and after an operation of changing the communication passage is performed by the pressure detecting means while air is flowing from the fuel tank toward the intake passage.

In this aspect, the flow passage resistance to gas differs between when gas flows from the fuel tank toward the intake passage through the canister and when gas flows from the fuel tank toward the intake passage bypassing the canister. In this case, while air is flowing from the fuel tank toward the intake passage, the internal pressure in the bypass passage converges to different values. Therefore, by detecting the pressures occurring in the bypass passage before and after the operation of changing the communication passage is performed by the changing means in a condition where air is flowing from the fuel tank toward the intake passage, it becomes possible to determine whether there is an abnormality in the bypass passage or the changing means.

If the amount of flow of air from the fuel tank to the intake passage becomes small, that is, the flow rate of air becomes low, after the operation of changing the communication passage is performed by the changing means, the internal pressure in the fuel tank or the internal pressure in the bypass passage becomes a value near the atmospheric pressure. In this case, the difference between the flow passage resistance of the main passage and the flow passage resistance of the bypass passage does not remarkably appear in the aforementioned internal pressure. Therefore, if it is determined whether the bypass passage or the changing means has an abnormality based on the internal pressure under a condition that the amount of flow of air from the fuel tank to the intake passage is small, it becomes impossible to clearly discriminate whether the internal pressure is attributed to a reduction in the amount of flow of air or to an abnormality in the bypass passage or the changing means, so that such an abnormality cannot be accurately determined. Therefore, in order to accurately determine whether the bypass passage or the changing means has an abnormality, it is appropriate to determine whether the bypass passage or the changing means has an abnormality based on the aforementioned internal pressure under a condition where the difference between the flow passage resistance of the main passage and the flow passage resistance of the bypass passage can reliably appear, for example, a condition where the amount of flow of air from the fuel tank to the intake passage is at least a predetermined value continues for a relatively long time, etc., after the operation of changing the communication passage is performed by the changing means.

In the first and second aspects, the abnormality determining means may determine whether there is an abnormality in at least one of the bypass passage and the changing means based on the pressure detected by the pressure detecting means under a condition where a difference between a flow passage resistance of the main passage and a flow passage resistance of the bypass passage is allowed to appear, after the operation of changing the communication passage is performed by the changing means. Therefore, the precision in determination regarding the abnormality can be improved.

In the aforementioned aspects, the abnormality determining means may determine whether there is an abnormality in at least one of the bypass passage and the changing means based on the pressure detected by the pressure detecting means at a time point when a state where an amount of flow of air from the fuel tank to the intake passage is at least a predetermined value continues for a predetermined length of time after the operation of changing the communication passage is performed by the changing means.

Furthermore, in the aforementioned aspects, the abnormality determining means may determine whether there is an abnormality in at least one of the bypass passage and the changing means based on whether there is a period during which an absolute value of an amount of change in the pressure detected by the pressure detecting means becomes at least a predetermined amount while a state where an amount of flow of air from the fuel tank to the intake passage is at least a predetermined value continues for a predetermined length of time after the operation of changing the communication passage is performed by the changing means.

If the bypass passage is clogged under a condition where the fuel tank and the intake passage are connected in communication via the bypass passage, the flow passage resistance becomes large, and the internal pressure in the fuel tank converges to a value close to the atmospheric pressure, as mentioned above.

Therefore, in the first and second aspects, the abnormality determining means may determine that the bypass passage has a clogged abnormality if the pressure detected by the pressure detecting means becomes substantially equal to an atmospheric pressure after the communication passage is changed to the bypass passage by the changing means.

If the changing means has an abnormality, the internal pressure in the fuel tank hardly changes before and after the operation of changing the communication passage is performed by the changing means.

Therefore, in the first and second aspects, the abnormality determining means may determine that the changing means has an abnormality if an absolute value of an amount of change from the pressure detected by the pressure detecting means before the operation of changing the communication passage is performed by the changing means to the pressure detected by the pressure detecting means after the operation of changing the communication passage is performed is at most a predetermined value.

Furthermore, in the first and second aspects, the abnormality diagnostic apparatus may determine whether there is an abnormality in at least one of the bypass passage and the changing means based on an extent of variation of the pressure detected by the pressure detecting means before and after the operation of changing the communication passage is performed by the changing means.

In the aforementioned aspects, the extent of variation of the internal pressure in the fuel tank and the extent of variation of the internal pressure in the bypass passage differ from each other because the flow passage resistance differs between when gas is flowing from the fuel tank toward the intake passage through the canister and when gas flows toward the intake passage, bypassing the canister.

If the bypass passage is clogged, the internal pressure in the fuel tank and the internal pressure in the bypass passage hardly vary but remain at fixed values. If the changing means has an abnormality, the extent of variation of the internal pressure in the fuel tank and the extent of variation of the internal pressure in the bypass passage hardly change before and after the operation of changing the communication passage is performed by the changing means. If both the bypass passage and the changing means are normally functioning, the extent of variation of the internal pressure in the fuel tank and the extent of variation of the internal pressure in the bypass passage change before and after the passage change by the changing means. Therefore, by detecting the extent of vibration of the internal pressure in the fuel tank or the extent of vibration of the internal pressure in the bypass passage before and after the operation of changing the communication passage is performed by the changing means while air is flowing from the fuel tank to the intake passage, it becomes possible to determine whether the bypass passage or the changing means has an abnormality.

At the time of a fluctuation in the operational state of the internal combustion engine or the like, the negative pressure led into the intake passage also fluctuates, so that the amount of flow of air from the fuel tank toward the intake passage changes, and therefore the value of convergence of the internal pressure in the fuel tank or the internal pressure in the bypass passage fluctuates. If under such a condition, it is determined whether the bypass passage or the changing means has an abnormality based on the aforementioned internal pressures occurring before and after the operation of changing the communication passage is performed by the changing means, it becomes impossible to clearly discriminate whether the fluctuation in the internal pressure is caused by a change in the amount of flow of air or by an abnormality in the bypass passage or the changing means, so that it becomes impossible to accurately determine whether the bypass passage or the changing means has an abnormality.

If a predetermined operational state of the internal combustion engine is maintained, the negative pressure led into the intake passage does not fluctuate, so that the amount of flow of air from the fuel tank to the intake passage does not change. In this case, the internal pressure in the fuel tank or the bypass passage converges to a constant value corresponding to the flow passage resistance between the fuel tank and the intake passage.

Therefore, in the first and second aspects, if a predetermined operational state of the internal combustion engine is maintained when it is determined by the abnormality determining means whether the bypass passage or the changing means has an abnormality, it becomes possible to improve the precision in determination regarding an abnormality in the bypass passage or the changing means.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIGS. 3A to 3D are diagrams for illustrating a technique for calculating a vapor concentration correction factor;

FIGS. 4A to 4C are time charts for illustrating operations performed in conjunction with determination as to whether there is an abnormality in the system of the embodiment;

DETAILED DESCRIPTION OF PREFERRED EMBODIMENTS

Preferred embodiments of the invention will be described hereinafter with reference to the accompanying drawings.

Figure 1:
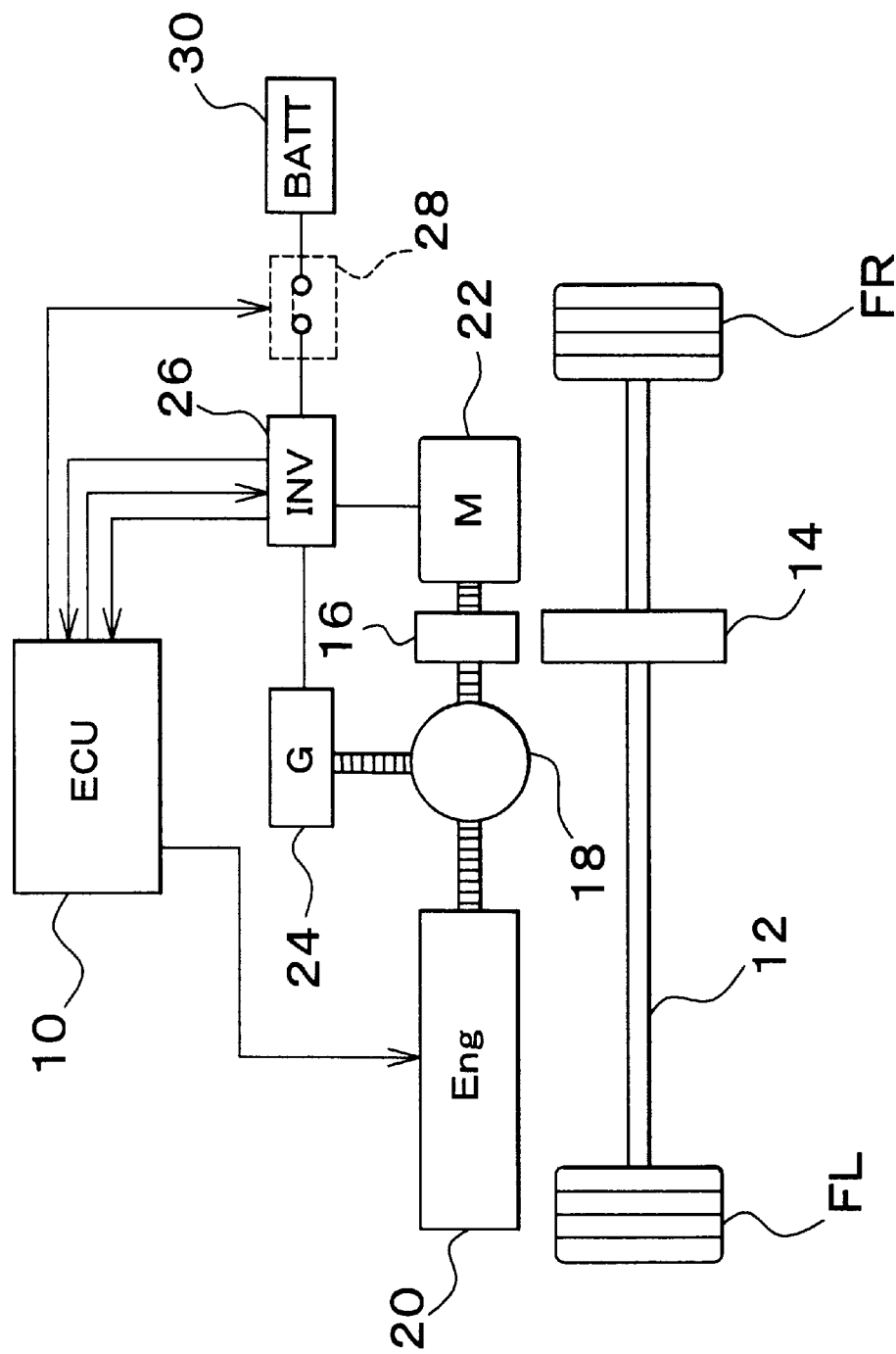
FIG. 1 is a schematic diagram of a drive mechanism of a vehicle into which an abnormality diagnostic apparatus of a fuel vapor purge system in accordance with an embodiment of the invention is installed.

FIG. 1 is a schematic diagram of a drive mechanism of a vehicle into which an abnormality diagnostic apparatus of a fuel vapor purge system in accordance with an embodiment of the invention is installed. The system in this embodiment includes an electronic control unit (hereinafter, simply referred to as "ECU") 10, and is controlled by the ECU 10. The fuel vapor purge system abnormality diagnostic apparatus of this embodiment is installed in a hybrid vehicle that runs on suitable combinations of drive power sources, that is, an internal combustion engine and an electric motor, as described below.

As shown in FIG. 1, a speed reducer 14 is fixed to an axle 12 connecting a left wheel FL and a right wheel PR. A planetary gear mechanism 18 is engaged with the speed reducer 14 via a gear 16. The planetary gear mechanism 18 includes a planetary carrier connected to an output shaft of an internal combustion engine 20, a ring gear connected to an output shaft of an electric motor 22, and a sun gear connected to an output shaft of a generator 24.

The generator 24 and the electric motor 22 are electrically connected to a battery 30 via an inverter 26 and a main relay 28. The main relay 28 performs a function of closing or opening a power circuit from the battery 30 to the inverter 26 when driven by the ECU 10. The inverter 26 performs a function of conversion between direct current and three-phase alternating current using three-phase bridge circuits formed by plural transistors, between the battery 30 and the generator 24, and between the battery 30 and the electric motor 22. Power transistors in the inverter 26 are appropriately controlled by the ECU 10, so that each of the generator 24 and the electric motor 22 is controlled to a revolution speed in accordance with the frequency of alternating current, and produces a torque in accordance with the magnitude of current.

Prior to starting the engine 20, the generator 24 is supplied with power from the battery 30 via the inverter 26 to function as a starter motor for starting the engine 20. After the starting of the engine 20 is completed, the generator 24 functions as a power generator for supplying power to the battery 30 or the electric motor 22 via the inverter 26, by using an output from the engine 20. The electric motor 22, during normal running of the vehicle, is supplied with power in an appropriate manner to function as a motor for producing torque that adds to the output of the engine 20. During braking, the electric motor 22 functions as a power generator for supplying power to the battery 30 via the inverter 26, by using rotation of the axle 12.

In this embodiment, the vehicle is a hybrid vehicle that runs by suitably combining the engine 20 and the electric motor 22. The ECU 10 calculates a drive power required for the vehicle based on the amount of operation of an accelerator and a vehicle speed, and controls the torque ratios of the engine 20 and the electric motor 22 to the axle 12 so that the engine 20 efficiently operates for the required drive power.

Figure 2:
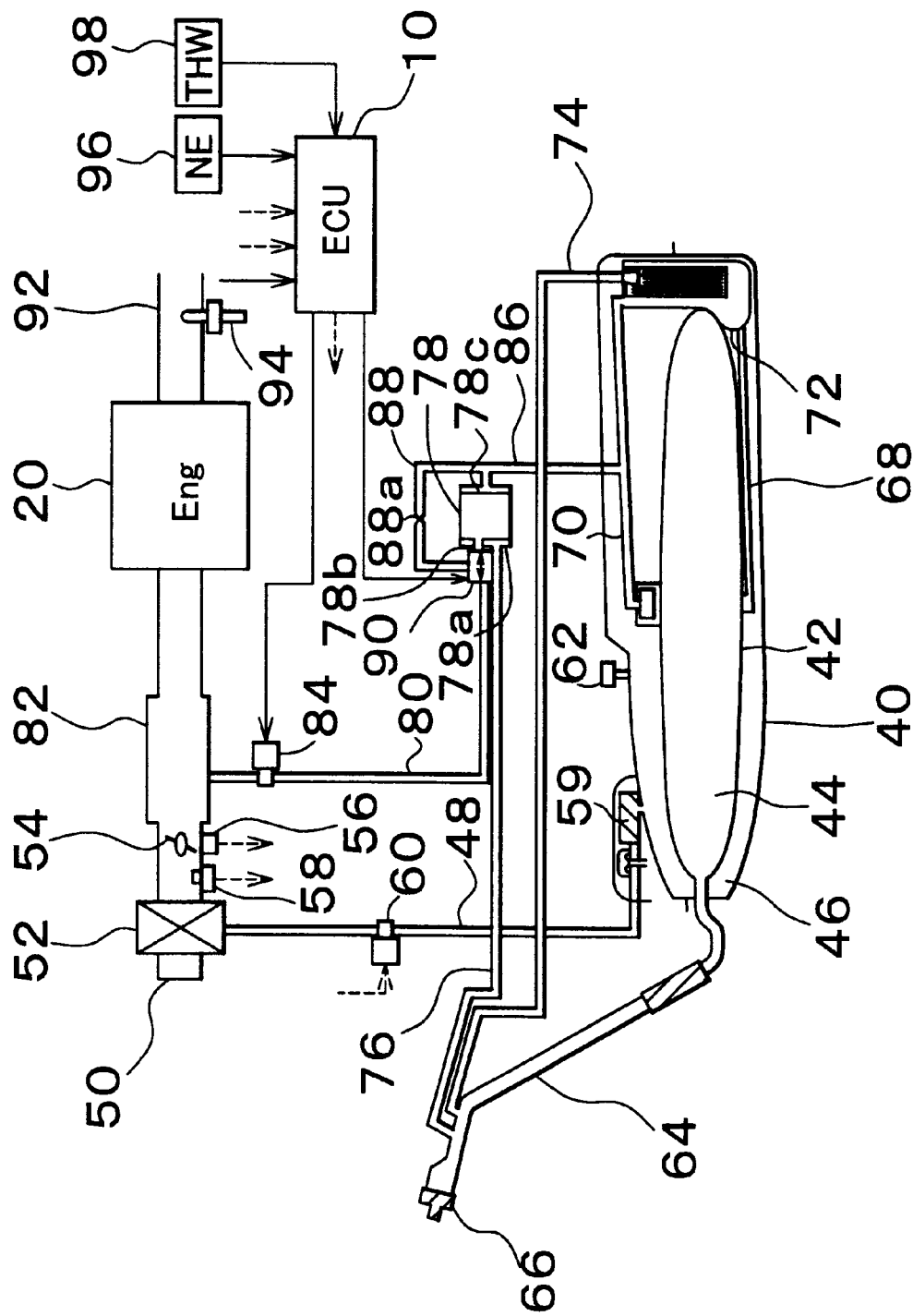
FIG. 2 is a system construction diagram of the fuel vapor purge system in the embodiment.

FIG. 2 is a system construction diagram of the fuel vapor purge system in this embodiment.

As shown in FIG. 2, the fuel vapor purge system of this embodiment includes a fuel tank 40 whose outer peripheral portion is formed by an iron member. The system prevents emission of fuel vapor occurring in the fuel tank 40 into the atmosphere, and supplies fuel vapor as a fuel to the engine 20. The fuel tank 40 is divided by a bladder diaphragm 42 into a fuel chamber 44 in which fuel is stored, and an air chamber 46 filled with air. The bladder diaphragm 42 is formed by a member of an expansible-and-contractible resin or the like, and is therefore able to expand or contract within the fuel tank 40 in accordance with the amount of fuel stored in the fuel chamber 44.

The air chamber 46 of the fuel tank 40 is connected in communication via an introduction passage 48 to an air cleaner 52 disposed in an intake passage 50 of the engine 20. The air cleaner 52 performs a function of filtering air taken into the engine 20. A throttle valve 54 for adjusting the amount of intake air is disposed in the intake passage 50 downstream of the air cleaner 52. A throttle opening degree sensor 56 is disposed near the throttle valve 54. The throttle opening degree sensor 56 outputs to the ECU 10 an electric signal in accordance with the degree of opening of the throttle valve 54. Based on the output signal of the throttle opening degree sensor 56, the ECU 10 detects the degree of opening TA of the throttle valve 54 (hereinafter, simply referred to as "throttle opening degree TA").

An air flow meter 58 is disposed between the air cleaner 52 and the throttle valve 54 in the intake passage 50. The air flow meter 58 outputs to the ECU 10 an electric signal in accordance with the mass of air passing through the air cleaner 52 per unit time. Based on the output signal of the air flow meter 58, the ECU 10 detects the mass Ga of air passing through the air cleaner 52 (hereinafter, simply referred to as "amount of intake air Ga").

A filter 59 for further purifying the air filtered by the air cleaner 52 is provided at an air chamber 46—side end of the introduction passage 48. A canister closing valve (hereinafter, referred to as "CCV") 60 is disposed in partway of the introduction passage 48. The CCV 60 is a two-position electromagnetic valve that is normally held in an open valve state and, upon supply of a drive signal from the ECU 10, is switched to a closed valve state. When the CCV 60 is open in the above-described construction, the air chamber 46 communicates with the atmosphere via the air cleaner 52.

A tank internal pressure sensor 62 is disposed in the air chamber 46. The tank internal pressure sensor 62 is connected to the ECU 10, and outputs to the ECU 10 an electric signal in accordance with the internal pressure in the air chamber 46. Based on the output signal of the tank internal pressure sensor 62, the ECU 10 detects the pressure $P_{TNK}$ in the air chamber 46 (hereinafter, referred to as "tank internal pressure $P_{TNK}$").

A filler pipe 64 for supplying fuel from outside is connected to the fuel chamber 44. A fuel cap 66 is detachably connected to an upper open end of the filler pipe 64. A lower communication passage 68 is connected to a lower face of the fuel chamber 44. An upper communication passage 70 is connected to an upper face of the fuel chamber 44. The lower communication passage 68 and the upper communication passage 70 are both connected to a capacity-fixed sub-tank 72. The sub-tank 72 contains a fuel pump (not shown). Fuel pumped up by the fuel pump is regulated to a predetermined pressure, and is then supplied to a fuel injection valve for injecting fuel into the engine 20, via a fuel supply passage (not shown).

A first vapor discharge passage 74 connected in communication to the filler pipe 64 is connected to an upper end of the sub-tank 72. The first vapor discharge passage 74 is a passage for releasing fuel vapor occurring in the fuel chamber 44 and the sub-tank 72 of the fuel tank 40. A portion of the fuel vapor occurring in the fuel chamber 44 and the sub-tank 72 liquefies when contacting fuel liquid deposited on a wall surfaces of the filler pipe 64, and is then collected into the fuel chamber 44 of the fuel tank 40.

The filler pipe 64 connects to a vapor introducing hole 78a of a canister 78 via a second vapor discharge passage 76. The second vapor discharge passage 76 is a passage for releasing a portion of the fuel vapor occurring in the fuel chamber 44 and the sub-tank 72 that remains after liquefaction, and fuel vapor occurring in the filler pipe 64. Such fuel vapor is led to the canister 78 through the second vapor discharge passage 76. The canister 78 has an activated carbon that adsorbs fuel vapor. By adsorbing fuel vapor from the fuel chamber 44, the sub-tank 72, and the filler pipe 64, the canister 78 serves to prevent release of fuel vapor into the atmosphere.

The canister 78 has a fuel purge hole 78b on the same side thereof as the vapor introducing hole 78a. The fuel purge hole 78b of the canister 78 is connected to a surge tank 82 disposed in the intake passage 50, via a purge passage 80. The purge passage 80 is a passage for purging fuel adsorbed in the canister 78 toward the surge tank 82, that is, toward the intake passage 50. An electromagnetically driven purge VSV 84 is disposed in the purge passage 80. The purge VSV 84 is supplied with a duty signal from the ECU 10, and is opened only during an on-duration of the duty signal. The purge VSV 84 is duty-controlled so that the volume ratio of the amount of flow of gas in the purge passage 80 (hereinafter, simply referred to as "amount of purge flow") to the amount of intake air Ga (hereinafter, simply referred to as "purge rate PGR") corresponds to the predetermined ratio.

The canister 78 has an atmosphere introducing hole 78c on a side opposite from the vapor introducing hole 78a and the fuel purge hole 78b. The atmosphere introducing hole 78c of the canister 78 is connected to the air chamber 46 of the fuel tank 40 via a gas passage 86. A bypass passage 88 bypassing the canister 78 is connected to the gas passage 86 and the purge passage 80. A venturi 88a is provided in the bypass passage 88. When gas flows through the bypass passage 88 in a normal state, the venturi 88a causes a flow passage resistance that is greater than the flow passage resistance occurring on gas flowing through the canister 78. That is, the venturi 88a serves to make the flow passage resistance in the bypass passage 88 greater than the flow passage resistance in the canister 78 in a normal state.

An electromagnetically driven bypass VSV 90 is disposed in a connecting portion between the bypass passage 88 and the purge passage 80. The bypass VSV 90 is a change valve that changes between a state of connecting the intake passage 50 and the canister 78 in communication and a state of connecting the intake passage 50 and the air chamber 46 in communication, that is, changes a passage connecting the intake passage 50 and the air chamber 46 between a passage extending via the canister 78 and the bypass passage 88 bypassing the canister 78. The bypass VSV 90 is a two-position electromagnetic valve that is held so as to connect the intake passage 50 to the canister 78 in a normal state and, upon supply of a drive signal from the ECU 10, is operated so as to connect the intake passage 50 directly to the air chamber 46, bypassing the canister 78.

An $O_2$ sensor 94 is disposed in an exhaust passage 92. The exhaust passage 92 outputs to the ECU 10 an electric signal in accordance with the oxygen concentration in exhaust gas flowing in the exhaust passage 92. The oxygen concentration in exhaust gas becomes lower when the air-fuel ratio of a mixture supplied into a cylinder of the engine 20 is on a rich side of a theoretical air-fuel ratio. When the air-fuel ratio is on a lean side of the theoretical air-fuel ratio, the oxygen concentration in exhaust gas becomes higher. When the air-fuel ratio is on the rich side, the $O_2$ sensor 94 outputs a high signal of about 0.9 V. When the air-fuel ratio is on the lean side, the $O_2$ sensor 94 outputs a low signal of about 0.1 V. Based on the output signal of the $O_2$ sensor 94, the ECU 10 determines whether the air-fuel ratio is on the rich side or whether the air-fuel ratio is on the lean side.

A crank angle sensor 96 and a water temperature sensor 98 are connected to the ECU 10. The crank angle sensor 96 generates a reference signal every time the rotational angle of a crankshaft of the engine 20 reaches a predetermined rotation angle. The crank angle sensor 96 also generates a pulse signal every time the crankshaft turns a predetermined rotational angle. The water temperature sensor 98 outputs an electric signal in accordance with the temperature of cooing water for cooling the engine 20. Based on the output signals of the crank angle sensor 96, the ECU 10 detects the engine revolution speed NE and the revolution angle of the engine 20. Furthermore, based on the output signal of the water temperature sensor 98, the ECU 10 detects the cooling water temperature THW (hereinafter, referred to as "water temperature THW").

The operation of the system of this embodiment will next be described.

In the system of the embodiment, fuel vapor occurring in the fuel chamber 44 of the fuel tank 40 and the sub-tank 72 is led to the second vapor discharge passage 76 via a route through the upper communication passage 70 and the first vapor discharge passage 74 and via a route through the filler pipe 64, and is then adsorbed to activated carbon in the canister 78.

When the engine 20 is in an operating state, a negative pressure is introduced into the surge tank 82 of the intake passage 50. If the CCV 60 and the purge VSV 84 are opened under this condition, air flows through a route of the air cleaner 52, the introduction passage 48, the air chamber 46, the gas passage 86, the atmosphere introducing hole 78c and the fuel purge hole 78b of the canister 78, the purge passage 80, and the surge tank 82. In this case, fuel adsorbed in the canister 78 desorbs from the activated carbon, and is purged together with air into the purge passage 80. Hereinafter, a mixture of fuel and air flowing through the purge passage 80 to the intake passage 50 will be referred to as "purge gas".

Purge gas purged into the purge passage 80 is taken into the cylinder of the engine 20, together with air flowing from the air cleaner 52 into the surge tank 82 via the throttle valve 54. Therefore, according to the system of this embodiment, fuel vapor that occurs in the fuel tank 40 can be supplied as a fuel into the engine 20 without being released into the atmosphere.

In order to secure good exhaust emissions from the engine 20, it is necessary to keep the air-fuel ratio A/F at a value near the theoretical air-fuel ratio A/F0. When purge gas is not being purged from the canister 78 toward the intake passage 50, it becomes possible to secure good exhaust emissions by setting a fuel injection duration TAU such that the ratio between the amount of intake air and the amount of fuel injected from the fuel injection valve equals the theoretical air-fuel ratio A/F0. However, in order to secure good exhaust emissions under a condition that purge gas is being purged toward the intake passage 50, it is necessary to shorten the fuel injection duration TAU set through the aforementioned technique by an amount of time corresponding to the amount of fuel contained in the purge gas.

In this embodiment, the fuel injection duration TAU is feedback-controlled so that the actual air-fuel ratio A/F becomes equal to the theoretical air-fuel ratio A/F0. That is, the fuel injection duration TAU is calculated as in the following equation:

$$TAU = TP \cdot \{1 + (FAF - 1.0) + (KG - 1.0) + FPG\} \quad (1)$$

In equation (1), TP is a basic fuel injection duration determined by the engine revolution speed NE and the amount of intake air Ga; FAF is a feedback correction factor for reducing the deviation between the actual air-fuel ratio A/F and the theoretical air-fuel ratio A/F0, and fluctuates about "1.0"; KG is an air-fuel ratio learning correction factor for absorbing an over-time change, an individual variation and the like of the engine 20, and fluctuates about "1.0"; and FPG is a purge correction factor for compensating for a deviation of the air-fuel ratio changed due to the purge of fuel from the canister 78.

The purge correction factor FPG is determined by multiplying the amount of purge flow by a vapor concentration correction factor FGPG for compensating for the deviation of the air-fuel ratio caused by purge, which factor indicates the vapor concentration per purge rate of 1%. The vapor concentration correction factor FGPG is determined by accumulating an amount of change $\Delta FAFAV (= FAFAV - 1.0)$ of a mean value FAFAV from "1.0" in every predetermined skip of the feedback correction factor FAF. The vapor concentration correction factor FGPG decreases (increases toward a negative side) with increases in the amount of vapor contained in purge gas, that is, with increases in the vapor concentration. In this embodiment, the vapor concentration is estimated from the value of the vapor concentration correction factor FGPG.

FIGS. 3A to 3D are diagrams for illustrating a technique for calculating the vapor concentration correction factor FGPG. FIG. 3A indicates changes in the output signal of the $O_2$ sensor 94 over time. FIG. 3B indicates over-time changes in the feedback correction factor FAF occurring with the over-time changes in the output signal of the $O_2$ sensor 94 indicated in FIG. 3A. FIG. 3C indicates over-time changes in the mean value FAFAV occurring with the over-time changes in the feedback correction factor FAF indicated in FIG. 3B. FIG. 3D indicates over-time changes in the vapor concentration correction factor FGPG occurring with the over-time changes in the mean value FAFAV indicated in FIG. 3C.

After the purge toward the intake passage 50 starts, the feedback correction factor FAF decreases as the air-furl ratio tends to shift toward a richer side, as indicated in FIGS. 3A to 3D. The mean value FAFAV of the feedback correction factor FAF also decreases with a time delay. As ΔFAFAV decreases, the vapor concentration correction factor FGPG decreases with a time delay. After the purge toward the intake passage 50 is stopped, the feedback correction factor FAF increases as the air-fuel ratio tends to shift toward a leaner side. The mean value FAFAV and the vapor concentration correction factor FGPG also increase with their respective time delays. If the amount of change ΔFAFAV is smaller than a predetermined value, the amount of change ΔFAFAV is not accumulated but the existing value of the vapor concentration correction factor FGPG is maintained.

In this embodiment, when the actual air-fuel ratio A/F shifts toward the richer side due to purge toward the intake passage 50, the feedback correction factor FAF is reduced so as to bring the actual air-fuel ratio A/F to the theoretical air-fuel ratio A/F0. In this case, since the feedback correction factor FAF decreases with increases in the vapor concentration, the vapor concentration can be grasped based on the amount of decrease in the feedback correction factor FAF. If the feedback correction factor FAF decreases due to purge toward the intake passage 50, the purge correction factor FPG is reduced by reducing the vapor concentration correction factor FGPG, and the decreased feedback correction factor FAF is increased by an amount corresponding to the amount of decrease in the purge correction factor FPG. By this technique, the fuel injection duration TAU can be shortened by an amount of time corresponding to the amount of fuel contained in purge gas flowing toward the intake passage 50.

The system of this embodiment is a system that supplies fuel vapor occurring in the fuel tank 40 to the engine 20 as a fuel without releasing fuel vapor into the atmosphere, as described above. Therefore, in the system of the embodiment, it is necessary to reliably detect a leak of fuel vapor toward the atmosphere from an outer wall of the fuel tank 40, and passages connecting the fuel tank 40 and the surge tank 82 of the intake passage 50, including the purge passage 80, the first and second vapor discharge passages 74, 76, the filler pipe 64, etc. (hereinafter, collectively referred to as "evaporative system"), which may be caused by a crack, or a disconnected piping, etc.

In this embodiment, when a condition for executing the evaporative system hole detection is met after the operation of the engine 20 starts, the CCV 60 is closed. In this case, even though a negative pressure is led into the evaporative system due to operation of the engine 20, fresh air is not introduced from the intake passage 50 through the introduction passage 48 toward the air chamber 46, so that the tank internal pressure $P_{TNK}$ in the air chamber 46 of the fuel tank 40 increases toward the negative pressure side. When the tank internal pressure $P_{TNK}$ reaches a predetermined negative pressure, the purge VSV 84 is completely closed. In this case, as the CCV 60 and the purge VSV 84 are set to a closed valve state, the evaporative system becomes tightly closed.

If no hole is formed in the evaporative system, the tank internal pressure $P_{TNK}$, after the evaporative system is tightly closed, gradually increases to the positive pressure side as fuel existing in the evaporative system evaporates. Conversely, if a hole is formed in the evaporative system, the atmosphere flows through the hole into the evaporative system, so that the tank internal pressure $P_{TNK}$ rapidly increases toward the atmospheric pressure. Therefore, it becomes possible to detect a hole in the evaporative system based on a change in the tank internal pressure $P_{TNK}$ occurring after the evaporative system has been tightly closed. In this embodiment, therefore, the detection of a hole in the evaporative system is performed based on a change in the tank internal pressure $P_{TNK}$ in the air chamber 46 occurring after both the CCV 60 and the purge VSV 84 have been set to the closed valve state.

The system of the embodiment is provided with the fuel tank 40 divided into the fuel chamber 44 and the air chamber 46 by the bladder diaphragm 42 as described above. If a hole is formed in the bladder diaphragm 42 of the fuel tank 40, fuel leaks from the fuel chamber 44 toward the air chamber 46, so that there is a danger of a portion of fuel vapor leaking out into the atmosphere. Therefore, in the system of the invention, it is necessary to diagnose whether fuel is leaking from the fuel chamber 44 to the air chamber 46. Hereinafter, diagnostic regarding hole formation in the bladder diaphragm 42 is termed bladder diaphragm hole detection.

If no hole is formed in the bladder diaphragm 42, no fuel leaks from the fuel chamber 44 to the air chamber 46, so that the vapor concentration in the air chamber 46 remains at a very low level. Conversely, if the bladder diaphragm 42 has a hole, fuel leaks from the fuel chamber 44 to the air chamber 46, so that the vapor concentration in the air chamber 46 becomes high. Therefore, by detecting the vapor concentration in the air chamber 46, a membrane hole of the bladder diaphragm 42 can be detected.

Therefore, in the embodiment, the bladder diaphragm hole detection is performed based on the vapor concentration correction factor FGPG provided after the intake passage 50 and the air chamber 46 are directly connected in communication by driving the bypass VSV 90. In this embodiment, the bladder diaphragm hole detection is performed only when it has been determined by the evaporative system hole detection that there is no hole formed in the evaporative system. If the vapor concentration correction factor FGPG becomes a value near "0" after the intake passage 50 and the air chamber 46 have been directly interconnected, it can be determined that not much fuel vapor exists in the air chamber 46, so that it is determined that no hole is formed in the bladder diaphragm 42. Conversely, if the vapor concentration correction factor FGPG increases to the negative side, it can be determined that a large amount of fuel vapor exists in the air chamber 46, so that it is determined that the bladder diaphragm 42 has a hole.

However, during the bladder diaphragm hole detection, it is necessary to drive the bypass VSV 90 so as to change a state where the intake passage 50 is connected in communication to the air chamber 46 via the canister 78 to a state where the intake passage 50 is directly connected in communication to the air chamber 46 via the bypass passage 88. Since the bypass VSV 90 is driven only during the bladder diaphragm hole detection, the state where the intake passage 50 is connected in communication to the canister 78 can be maintained for a long time. Therefore, carbon becomes likely to deposit on and around movable portions of the bypass VSV 90, thus causing a danger that the bypass VSV 90 will become fixed and direct connection between the intake passage 50 and the air chamber 46 will become impossible, or a danger that the bypass passage 88 will become clogged. Hereinafter, the bypass passage 88 and the bypass VSV 90 will be collectively referred to as "bypass system" if necessary.

When the bypass VSV 90 has a fixation abnormality, gas is purged from the air chamber 46 to the intake passage 50 via the canister 78 without flowing through the bypass passage 88 during the bladder diaphragm hole detection. In this case, because fuel adsorbed in the canister 78 is purged to the intake passage 50, together with gas in the air chamber 46, the vapor concentration correction factor FGPG does not become a value that indicates only the vapor concentration in the gas in the air chamber 46, so that it becomes impossible to precisely determine whether the bladder diaphragm 42 has a hole. Furthermore, if the bypass passage 88 has a clogged abnormality, purge of gas from the air chamber 46 toward the intake passage 50 is not performed. In this case, because the vapor concentration correction factor FGPG does not change in accordance with the vapor concentration in gas in the air chamber 46, it becomes impossible to precisely determine whether the bladder diaphragm 42 has a hole. Thus, if an abnormality occurs in the bypass system, there is a danger of incorrect determination regarding the presence/absence of a membrane hole in the bladder diaphragm 42.

Therefore, the system of the embodiment determines whether there is an abnormality in the bypass system in order to prevent incorrect determination regarding the presence/absence of a membrane hole in the bladder diaphragm 42. Characteristic portions of the embodiment will be described below with reference to FIGS. 4 and 5.

Figure 4C:
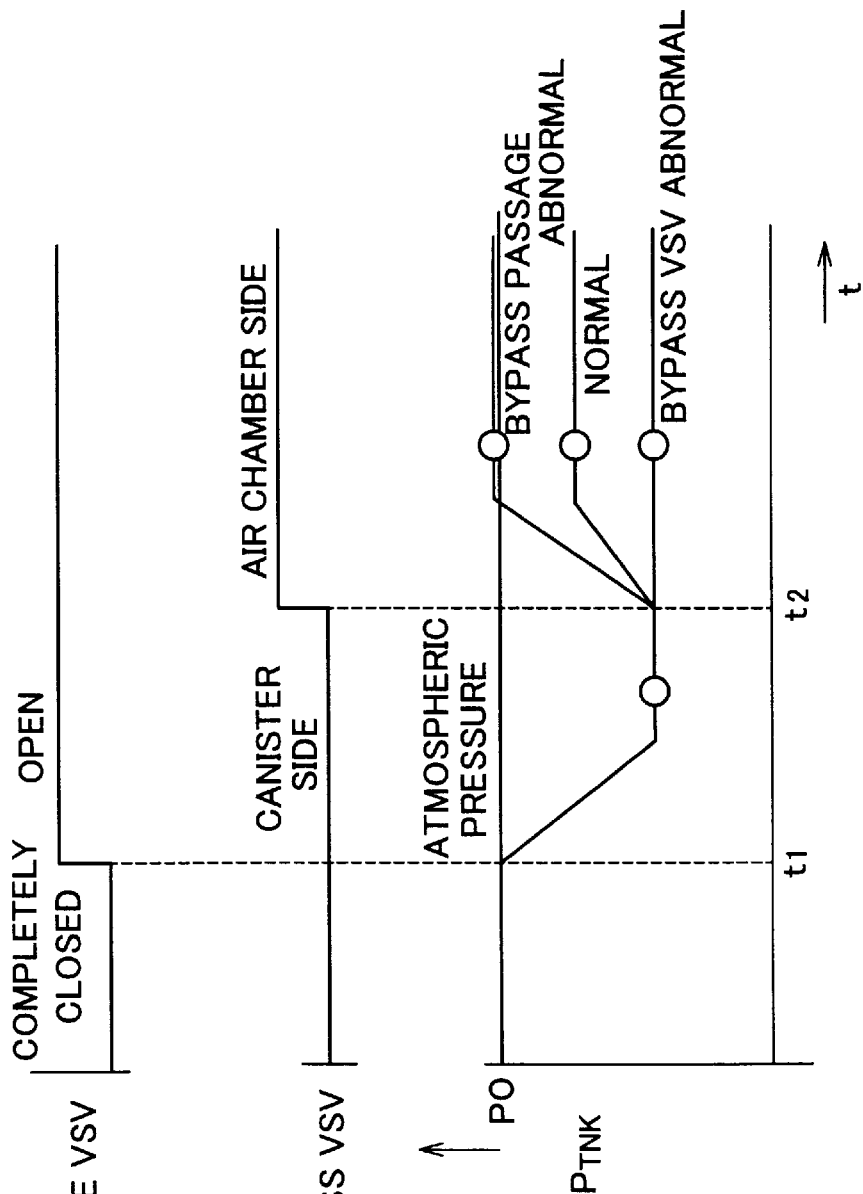

FIGS. 4A to 4C are time charts for illustrating operations performed in conjunction with determination as to whether there is an abnormality in the bypass system. FIGS. 4A to 4C are time charts regarding the bypass VSV 90, the purge VSV 84, and the tank internal pressure $P_{TNK}$.

In this embodiment, when the bypass VSV 90 is held in the completely closed state even under a condition where the engine 20 is operating (before time point t1 in FIGS. 4A to 4C), gas does not flow from the air chamber 46 through the purge passage 80 toward the intake passage 50. In this case, the tank internal pressure $P_{TNK}$ in the air chamber 46 is kept substantially at the atmospheric pressure P0. When under this condition, the bypass VSV 90 is opened (at time point t1 in FIGS. 4A to 4C), gas flows out of the air chamber 46 to the intake passage 50 via the purge passage 80, so that the tank internal pressure $P_{TNK}$ increases to the negative pressure side as indicated in FIG. 4C. In this case, a drive signal is not supplied to the bypass VSV 90, that is, the intake passage 50 and the canister 78 are interconnected in communication, so that the tank internal pressure $P_{TNK}$ converges to a negative pressure corresponding to the flow passage resistance of the canister 78.

After the tank internal pressure $P_{TNK}$ converges to the predetermined negative pressure, a drive signal is supplied to the bypass VSV 90 so as to directly connect the intake passage 50 and the air chamber 46 at a time point t2 indicated in FIG. 4. The bypass passage 88 includes the venturi 88a for making the flow passage resistance of the bypass passage 88 greater than the flow passage resistance caused by the canister 78. Therefore, when the bypass VSV 90 normally functions, the amount of flow of gas from the air chamber 46 toward the intake passage 50 decreases after the time point t2 from the amount of flow occurring at the time pint t2. In this case, the tank internal pressure $P_{TNK}$ is raised toward a negative pressure corresponding to the flow passage resistance of the bypass passage 88, that is, a negative pressure that is at the atmospheric pressure side of the negative pressure that corresponds to the flow passage resistance of the canister 78. However, if the bypass VSV 90 becomes fixed in a state where the intake passage 50 and the canister 78 are connected in communication, the amount of flow of gas from the air chamber 46 toward the intake passage 50, after the time point t2, does not change, but is kept at a value substantially equal to the tank internal pressure occurring at the time pint t2. Furthermore, if the bypass passage 88 is clogged although the bypass VSV 90 normally functions, gas cannot flow out of the air chamber 46 toward the intake passage 50, so that after the time point t2, the tank internal pressure $P_{TNK}$ is raised approximately to the atmospheric pressure P0.

Thus, when the tank internal pressure $P_{TNK}$ has been converged to a negative pressure corresponding to the flow passage resistance of the canister 78 by connecting the intake passage 50 and the canister 78 in communication, the bypass VSV 90 is driven. After that, the tank internal pressure $P_{TNK}$ is detected, so that it becomes possible to determine whether the bypass passage 88 has a clogged abnormality, and whether the bypass VSV 90 has a fixation abnormality.

Figure 5:
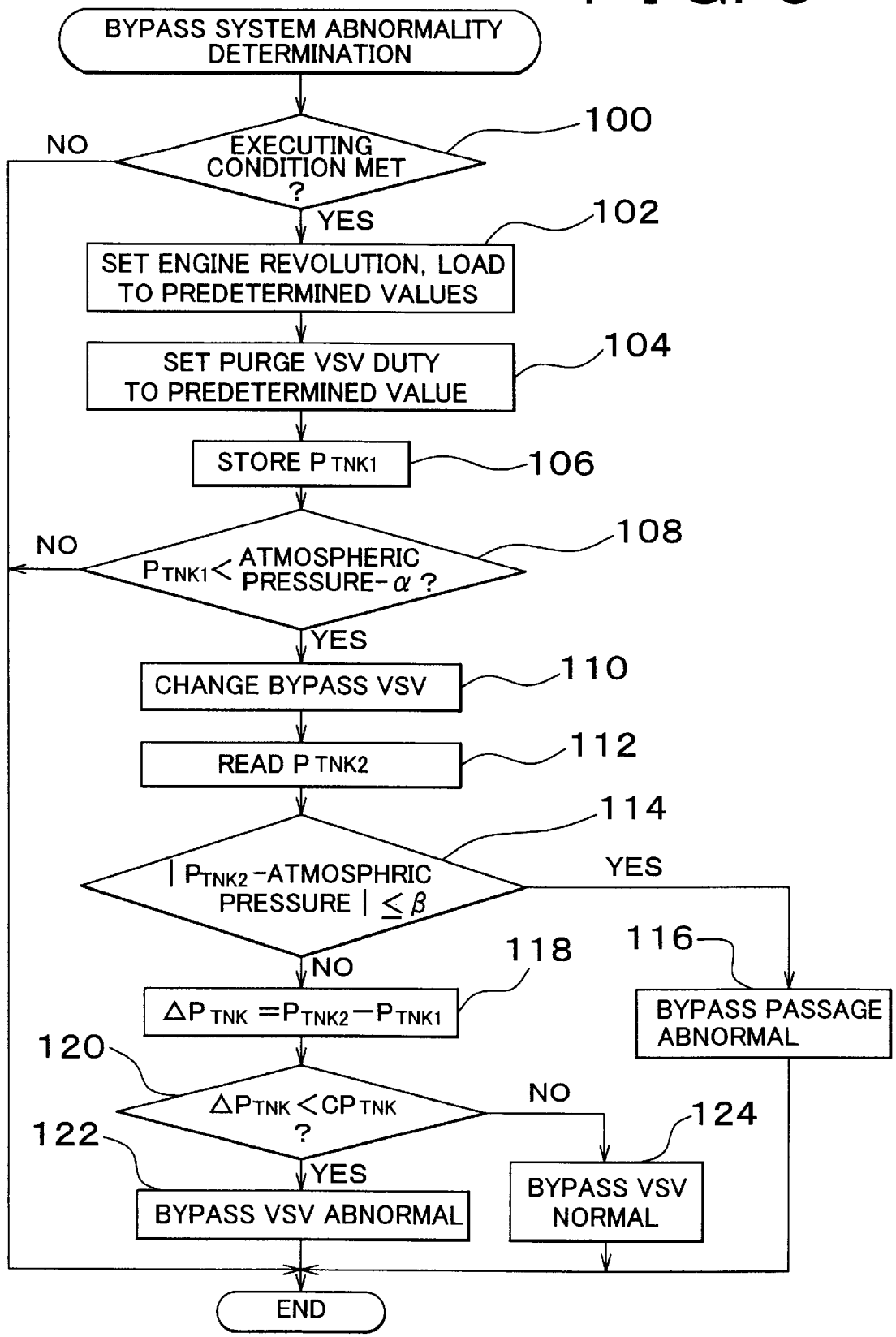
FIG. 5 is a flowchart exemplifying a control routine executed to determine whether the bypass system has an abnormality in the embodiment.

FIG. 5 is a flowchart exemplifying a control routine executed by the ECU 10 so as to diagnose whether the bypass system has an abnormality in the fuel vapor purge system abnormality diagnostic apparatus of this embodiment. The routine illustrated in FIG. 5 is started every time the process of the routine ends. When the routine illustrated in FIG. 5, the processing of step 100 is executed.

In step 100, the ECU 10 determines whether the condition for executing the bypass system abnormality diagnosis is met. This executing condition is met provided that the purge VSV 84 is opened during operation of the engine 20 so as to purge fuel adsorbed in the canister 78 to the intake passage 50, and that the water temperature THW at the time of the start of the engine 20 was low. Therefore, if it is determined that the execution condition is not met, the ECU 10 ends the present execution of the routine without executing any further processing. Conversely, if the aforementioned execution condition is met, the ECU 10 executes the processing of step 102.

In step 102, the ECU 10 executes a process of keeping the engine revolution speed NE and a throttle opening degree TA at fixed values. When the process of step 102 is executed, the drive power produced by the engine 20 is kept at a fixed value while the drive power produced by the electric motor 22 is changed if the drive power required for the vehicle changes.

In step 104, the ECU 10 executes a process of keeping the duty ratio of the drive signal to the purge VSV 84 at a fixed value. When the process of step 104 is executed, the degree of opening of the purge VSV 84 is fixed at a constant value, so that the amount of flow of purge gas flowing through the purge passage 80 to the intake passage 50 is kept at a constant level.

In step 106, the ECU 10 executes a process of storing the tank internal pressure $P_{TNK}$ occurring after the process of step 104 as $P_{TNK}$. Since the process of step 106 is executed under a condition where the engine 20 is in an operating state and the purge VSV 84 is opened, the tank internal pressure $P_{TNK}$ normally assumes a value on the negative side that is less than the atmospheric pressure P0 at the time of execution of step 106.

In step 108, the ECU 10 determines whether the $P_{TNK}$ stored in step 106 is less than the atmospheric pressure P0 by a predetermined value $\alpha$, that is, whether the differential pressure between $P_{TNK}$ and the atmospheric pressure P0 exceeds the predetermined value $\alpha$. The predetermined value $\alpha$ is a maximum value of the differential pressure between $P_{TNK1}$ and the atmospheric pressure P0 that allows a determination that a hole is formed in the outer wall of the air chamber 46, the purge passage 80, or the like.

If $P_{TNK}<P0-\alpha$ does not hold, it can be considered that the pressure in the air chamber 46 is kept at a value close to the atmospheric pressure although gas is being purged from the canister 78 toward the intake passage 50. In this case, it can be considered the tank internal pressure $P_{TNK}$ is not reduced to a desired negative pressure because a hole is formed in the outer wall of the air chamber 46, the purge passage 80, or the like. Therefore, when $P_{TNK1}<P0-\alpha$ does not hold, it is inappropriate to determine whether the bypass system has an abnormality based on the tank internal pressure $P_{TNK}$. Therefore, if the aforementioned determination is made, the present execution of the routine is ended.

Conversely, if $P_{TNK1}<P0-\alpha$ holds, it can be considered that the pressure in the air chamber 46 has been increased to the negative pressure side, and therefore it can be considered that no hole is formed in the outer wall of the air chamber 46, the purge passage 80, or the like. In this case, there is no inappropriateness or inconvenience to determine whether the bypass system has an abnormality based on the tank internal pressure $P_{TNK}$. Therefore, when it is determined that $P_{TNK1}<P0-\alpha$ holds, the ECU 10 executes a process of step 110.

In step 110, the ECU 10 executes a process of supplying a drive signal to the bypass VSV 90. When the process of step 110 is executed, the intake passage 50 is directly connected to the air chamber 46 from then on, bypassing the canister 78, if the bypass VSV 90 normally functions.

In step 112, the ECU 10 executes a process of reading and inputting the tank internal pressure $P_{TNK}$ occurring after the drive signal is supplied to the bypass VSV 90 in step 110, as $P_{TNK2}$. In this case, the tank internal pressure $P_{TNK}$ assumes a value that is closer to the atmospheric pressure P0 than the $P_{TNK}1$ is close to the atmospheric pressure P0, if the bypass VSV 90 normally functions.

In step 114, the ECU 10 determines whether the absolute value of a differential pressure between $P_{TNK2}$ read in step 112 and the atmospheric pressure is at most a predetermined value $\beta$. The predetermined value $\beta$ is a maximum value of the differential pressure between $P_{TNK2}$ and the atmospheric pressure P0 that allows a determination that the bypass passage 88 is clogged so that gas cannot flow through the bypass passage 88.

If $|P_{TNK2}-P0|\leq\beta$ holds, it can be considered that gas is not flowing from the air chamber 46 to the intake passage 50 via the bypass passage 88 although the drive signal is supplied to the bypass VSV 90 while air is flowing from the intake passage 50 through the introduction passage 48 into the air chamber 46, with an increase in the tank internal pressure $P_{TNK}$ toward the atmospheric pressure. Therefore, if $|P_{TNK2}-P0|\leq\beta$ holds, it can be considered that the bypass passage 88 has a clogged abnormality. Therefore, when such a determination is made, the ECU 10 subsequently executes a process of step 116.

In step 116, the ECU 10 executes a process of setting a flag that indicates that the bypass passage 88 has the clogged abnormality. When this flag is set, it is also possible to produce an alarm or turn on an alarm lamp so as to inform a vehicle occupant of the abnormality of the bypass passage 88. It is also possible to activate the alarm or the alarm lamp if the flag is set successively twice or more times. After the process of step 116 ends, the ECU 10 ends the present execution of the routine.

If it is determined in step 114 that $|P_{TNK2}-P0|\leq\beta$ does not hold, the ECU 10 subsequently executes a process of step 118.

In step 118, the ECU 10 executes a process of calculating a difference $\Delta P_{TNK}$ between $P_{TNK2}$ read in step 112 and $P_{TNK1}$ stored in step 106 ($\Delta P_{TNK}=P_{TNK2}-P_{TNK1}$).

In step 120, the ECU 10 determines whether $\Delta P_{TNK}$ calculated in step 118 is smaller than a predetermined threshold $CP_{TNK}$. The predetermined threshold $CP_{TNK}$ is a very small value that allows a determination that the tank internal pressure $P_{TNK}$ has no change before and after the drive signal is supplied to the bypass VSV 90.

If $P_{TNK}<CP_{TNK}$ holds, it can be considered that the tank internal pressure $P_{TNK}$ has substantially no change before and after the supply of the drive signal to the bypass VSV 90, and therefore it can be considered that the bypass VSV 90 is not normally functioning. Therefore, if such a determination is made, the ECU 10 subsequently executes a process of step 122.

Conversely, if $P_{TNK}<CP_{TNK}$ does not hold, it can be considered that the tank internal pressure $P_{TNK}$ has a great change before and after the supply of the drive signal to the bypass VSV 90. In this case, it can be considered that the bypass VSV 90 is normally functioning in accordance with the drive signal. Therefore, when such a determination is made, the ECU 10 subsequently executes a process of step 124.

In step 122, the ECU 10 executes a process of setting up a flag that indicates that the bypass VSV 90 has the fixation abnormality. When this flag is set, it is also possible to produce an alarm or turn on an alarm lamp so as to inform a vehicle occupant of the abnormality of the bypass VSV 90. It is also possible to activate the alarm or the alarm lamp if the flag is set successively twice or more times.

Subsequently in step 124, the ECU 10 executes a process of resetting the flag indicating that the bypass VSV 90 has the fixation abnormality. After the process of step 122 or step 124 ends, the ECU 10 ends the present execution of the routine.

Through the above-described processes, if the tank internal pressure $P_{TNK}$ occurring after the supply of the drive signal to the bypass VSV 90 changes from the tank internal pressure $P_{TNK}$ occurring before the supply of the drive signal under the condition where gas is flowing from the air chamber 46 to the intake passage 50 due to the operating state of the engine 20, it can be determined that the bypass VSV 90 is normally functioning. Conversely, if the tank internal pressure $P_{TNK}$ after the supply of the drive signal to the bypass VSV 90 does not substantially change from the tank internal pressure $P_{TNK}$ occurring before the supply of the drive signal, it can be determined that the bypass VSV 90 has the fixation abnormality. If under the aforementioned condition, the tank internal pressure $P_{TNK}$ becomes a value near the atmospheric pressure after the drive signal is supplied to the bypass VSV 90 so as to connect the intake passage 50 and the air chamber 46 in communication via the bypass passage 88, it can be determined that the bypass passage 88 has the clogged abnormality.

Thus, the embodiment is able to determine whether the bypass VSV 90 has the fixation abnormality by comparing the tank internal pressure $P_{TNK}$ occurring before the supply of the drive signal to the bypass VSV 90 and the tank internal pressure $P_{TNK}$ occurring after the supply of the drive signal. Furthermore, the embodiment is able to determine whether the bypass passage 88 has the clogged abnormality based on the tank internal pressure $P_{TNK}$ occurring after the supply of the drive signal to the bypass VSV 90. Therefore, according to the embodiment, it becomes possible to prevent a false determination regarding the presence/absence of a membrane hole in the bladder diaphragm 42 caused by an abnormality occurring in the bypass system.

In this embodiment, when it is to be determined whether the bypass system has an abnormality, the embodiment keeps the engine revolution speed NE of the engine 20, the throttle opening degree TA, and the duty ratio of the drive signal to the purge VSV 84 at constant values. In this case, fluctuation in the negative pressure led into the surge tank 82 of the intake passage 50 is avoided, so that the amount of purge flow from the air chamber 46 to the intake passage 50 is kept at a constant amount, and so that during operation of the engine 20, the tank internal pressure $P_{TNK}$ converges to a constant value corresponding to the flow passage resistance between the air chamber 46 and the intake passage 50. Therefore, this embodiment is able to avoid fluctuations in the tank internal pressure $P_{TNK}$ caused by changes in the operational state of the engine 20 or by changes in the duty ratio regarding the purge VSV 84. As a result, it becomes possible to determine whether the bypass passage 88 has the clogged abnormality and whether the bypass VSV 90 has the fixation abnormality, with good precision.

In the above-described first embodiment, the passage extending via the canister 78 between the gas passage 86 and the purge passage 80 corresponds to "a main passage" described in the appended claims of this application. The bypass VSV 90 corresponds to "changing means" described in the claims. The ECU 10, detecting the tank internal pressure $P_{TNK}$ in the air chamber 46 based on the output signal of the tank internal pressure sensor 62, realizes "pressure detecting means" described in the claims. The ECU 10, executing the process of step 114 or step 120, realizes "abnormality determining means" described in the claims.

Although in the first embodiment, it is determined whether the bypass system has an abnormality based on the tank internal pressure $P_{TNK}$ occurring before and after the supply of the drive signal to the bypass VSV 90, it is also possible to determine whether the bypass system has an abnormality based on the amplitude or extent of variations of the tank internal pressure $P_{TNK}$. In the foregoing embodiment, the purge VSV 84 is duty-driven. Therefore, the tank internal pressure $P_{TNK}$ in the air chamber 46 varies in accordance with the frequency of the duty ratio of the drive signal to the purge VSV 84. The amplitude of the tank internal pressure $P_{TNK}$ occurring when gas flows from the air chamber 46 toward the intake passage 50 via the canister 78 and the amplitude of the tank internal pressure $P_{TNK}$ occurring when gas flows from the air chamber 46 toward the intake passage 50 via the bypass passage 88 assume different values due to different flow passage resistances of the canister 78 and the bypass passage 88.

If the bypass passage 88 is clogged, the tank internal pressure $P_{TNK}$ remains at a constant value instead of varying. If the bypass VSV 90 has the fixation abnormality, the amplitude of the tank internal pressure $P_{TNK}$ does not substantially change before and after the supply of the drive signal to the bypass VSV 90. Therefore, by comparing the amplitude of the tank internal pressure $P_{TNK}$ occurring before the supply of the drive signal to the bypass VSV 90 and the amplitude of the tank internal pressure $P_{TNK}$ occurring after the supply of the drive signal, it can be determined whether the bypass VSV 90 has the fixation abnormality. Furthermore, based on the amplitude of the tank internal pressure $P_{TNK}$ after the supply of the drive signal to the bypass VSV 90, it can be determined whether the bypass passage 88 has the clogged abnormality.

Figure 6:
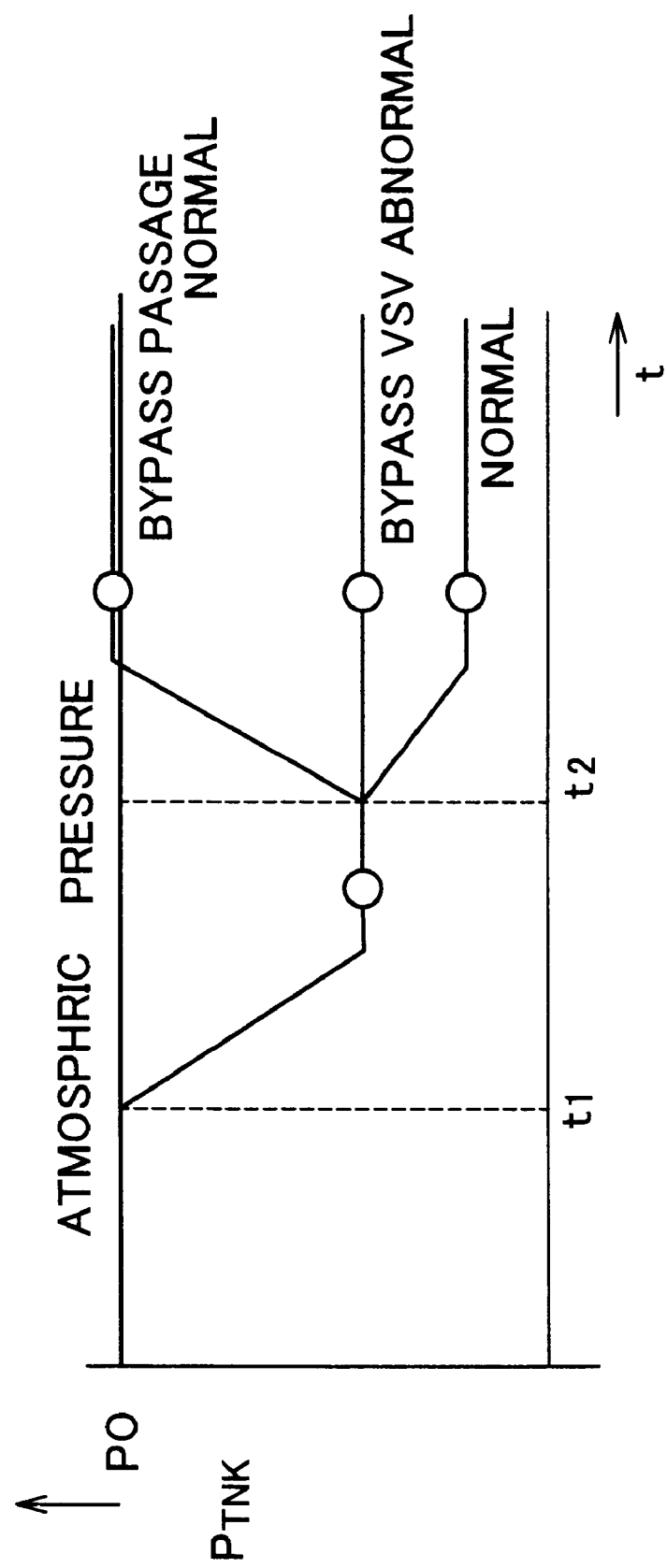
FIG. 6 is a time chart for illustrating operations performed in conjunction with determination as to whether the bypass system has an abnormality in a system according to a modification in the invention.

Furthermore, although in the first embodiment, the flow passage resistance of the bypass passage 88 is made greater than the flow passage resistance of the canister 78 by providing the venturi 88a in partway of the bypass passage 88, it is also possible to make the flow passage resistance of the bypass passage 88 smaller than the flow passage resistance in the canister 78 by changing the inside diameter of the bypass passage 88 instead of providing the venturi 88a in the bypass passage 88. In such a construction, the amount of flow of gas from the air chamber 46 toward the intake passage 50 and a further negative pressure is led into the air chamber 46, if the bypass VSV 90 normally functions. In this case, the tank internal pressure $P_{TNK}$ is reduced toward a negative pressure corresponding to the flow passage resistance of the bypass passage 88, that is, a negative pressure that is greater than a negative pressure corresponding to the flow passage resistance of the canister 78, as indicated in FIG. 6. Therefore, in the aforementioned construction, the bypass VSV 90 is driven while the tank internal pressure $P_{TNK}$ is converged to the negative pressure corresponding to the flow passage resistance of the canister 78. If the tank internal pressure $P_{TNK}$ afterwards further changes toward the negative pressure side, it can be determined that the bypass VSV 90 is normally functioning.

A second embodiment of the invention will be described with reference to FIGS. 7 and 8.

Figure 7:
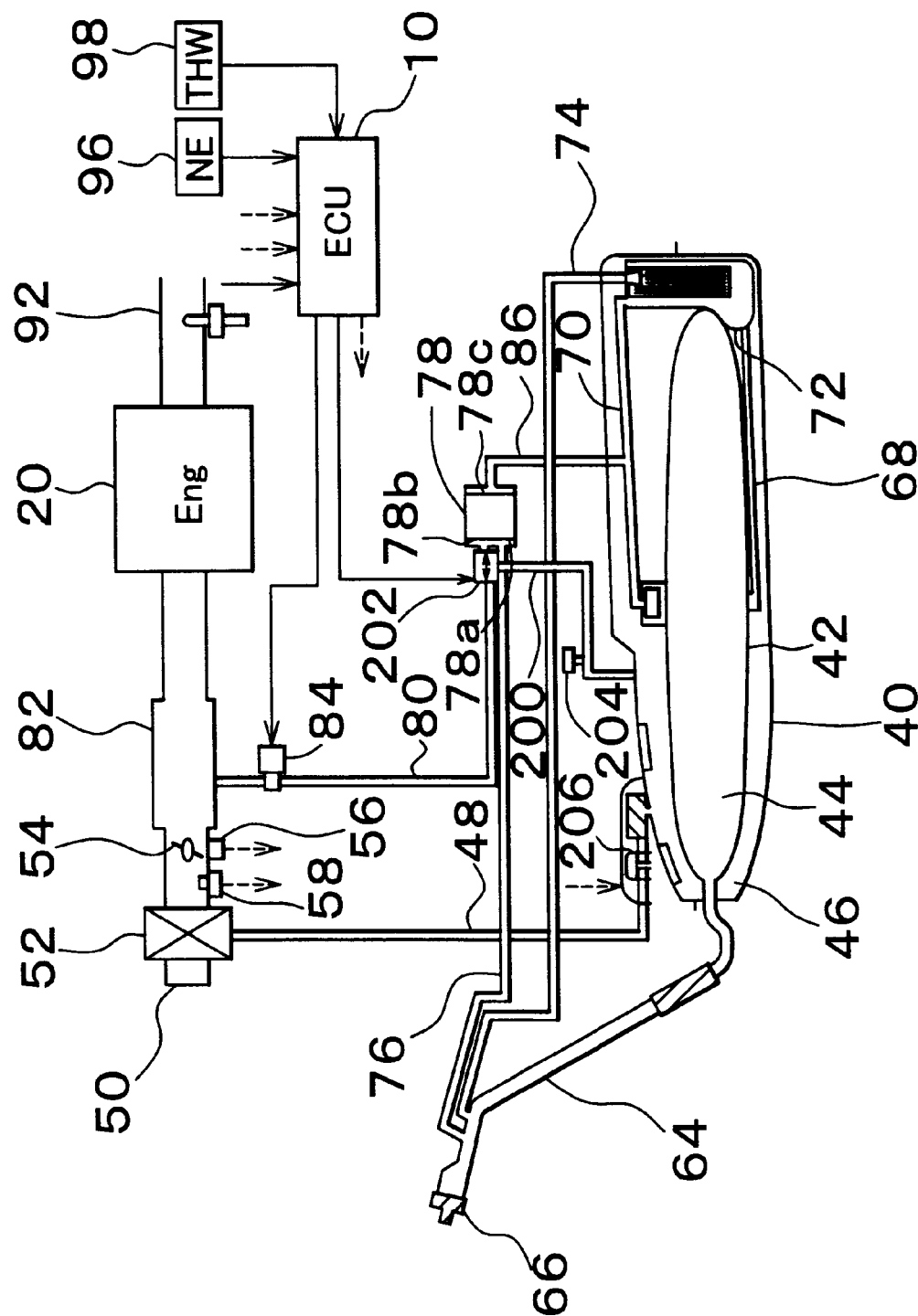
FIG. 7 is a diagram of a system construction of an abnormality diagnostic apparatus of a fuel vapor purge system in accordance with a second embodiment of the invention.

FIG. 7 is a diagram of a system construction of an abnormality diagnostic apparatus of a fuel vapor purge system in accordance with the embodiment. Component portions of this embodiment substantially the same as those shown in FIG. 2 are represented by the same reference numerals in FIG. 7, and will not be described again.

As shown in FIG. 7, a bypass passage 200 bypassing a canister 78 is connected to both a purge passage 80 and an air chamber 46. That is, the purge passage 80 and the air chamber 46 are directly interconnected by the bypass passage 200 bypassing the canister 78. The bypass passage 200 has an inside diameter that is smaller than an inside diameter of a gas passage 86, and has a capacity that is smaller than a capacity of a fuel tank 40.

An electromagnetically driven bypass VSV 202 is disposed in a connecting portion of the bypass passage 200 to the purge passage 80. The bypass VSV 202 is a change valve that changes between a state of connecting an intake passage 50 and the canister 78 in communication and a state of connecting the intake passage 50 and the air chamber 46 in communication. The bypass VSV 202 is a two-position electromagnetic valve that is held so as to connect the intake passage 50 to the canister 78 in a normal state and, upon supply of a drive signal from an ECU 10, is operated so as to connect the intake passage 50 directly to the air chamber 46, bypassing the canister 78.

A pressure sensor 204 is disposed in the bypass passage 200. The pressure sensor 204 is connected to the ECU 10, and outputs to the ECU 10 an electric signal corresponding to the pressure in the bypass passage 200. Based on the output signal of the pressure sensor 204, the ECU 10 detects the pressure in the bypass passage 200 (hereinafter, referred to as "passage internal pressure $P_{BP}$").

A CCV 206 is disposed in an air chamber 46—side end portion of an introduction passage 48. Similar to the above-described CCV 60, the CCV 206 is a two-position electromagnetic valve that is normally held in an open valve state and, upon supply of a drive signal from the ECU 10, is set to a closed valve state.

The fixation abnormality of the bypass VSV 202 is separated into an abnormality where the bypass VSV 202 is fixed while connecting the intake passage 50 and the canister 78 in communication (hereinafter, this abnormality will be referred to as "closed-side fixation abnormality"), and an abnormality where the bypass VSV 202 is fixed while directly connecting the intake passage 50 and the air chamber 46 in communication (hereinafter, this abnormality will be referred to as "open-side fixation abnormality").

If the closed-side fixation abnormality occurs in the bypass VSV 202, the vapor concentration correction factor FGPG does not become a value that indicates only the vapor concentration in gas present in the air chamber 46 due to purge of fuel adsorbed in the canister 78 to the intake passage 50 during the bladder diaphragm hole detection. As a result, it becomes impossible to precisely determine whether a membrane hole exists in the bladder diaphragm 42. If the bypass VSV 202 has the open-side fixation abnormality, the direct connection between the intake passage 50 and the air chamber 46 is maintained after the bladder diaphragm hole detection, so that it becomes impossible to purge fuel adsorbed in the canister 78 toward the intake passage 50.

In the system of this embodiment, therefore, the fixation abnormality of the bypass VSV 202 is separated into the closed-side fixation abnormality and the open-side fixation abnormality.

Figures 8A, 8B, 8C, 8D, 8E:
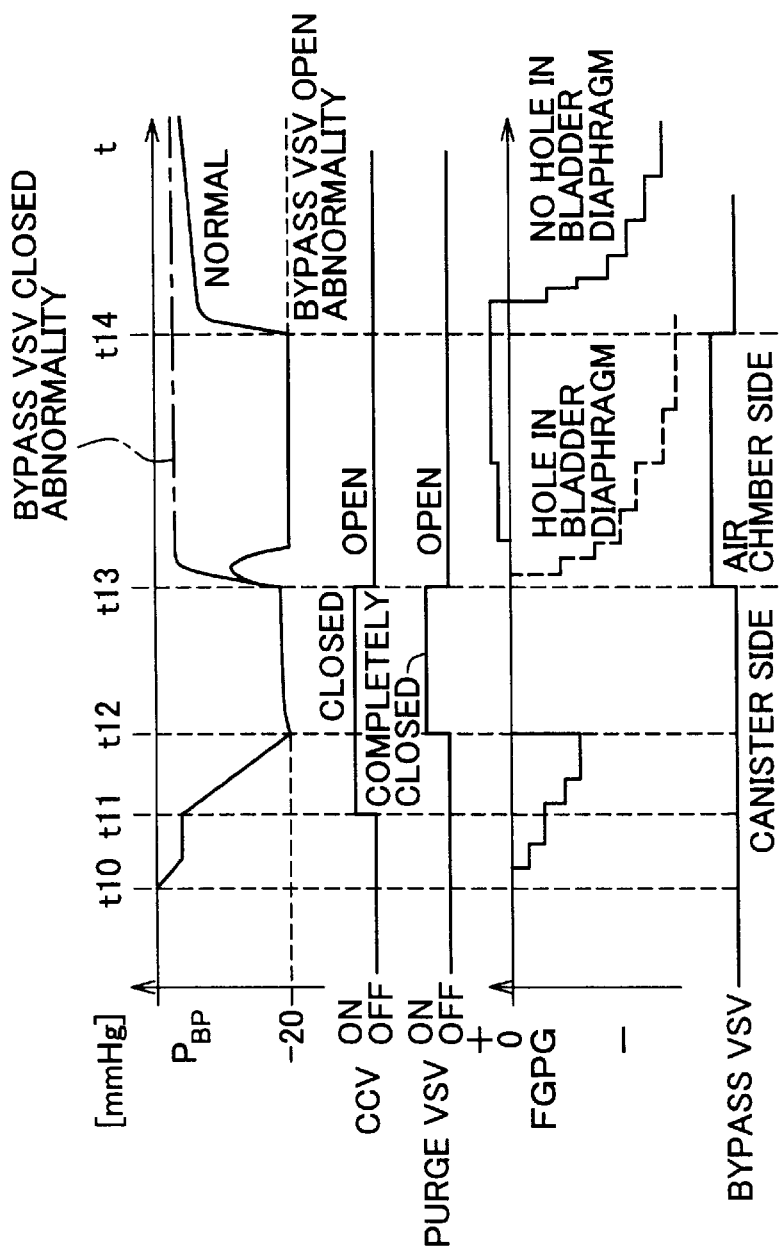
FIGS. 8A to 8E are time charts for illustrating operations performed in conjunction with determination as to whether the bypass valve (hereinafter "VSV") has an abnormality in the system of the embodiment.

FIGS. 8A to 8E are time charts for illustrating operations performed in conjunction with determination as to whether the bypass VSV 202 has the fixation abnormality. FIGS. 8A to 8E are time charts regarding the passage internal pressure $P_{BP}$, the CCV 206, the purge VSV 84, the vapor concentration correction factor FGPG, and the bypass VSV 202, respectively. In FIG. 8A, a solid line indicates a case where the bypass VSV 202 normally functions, and a one-dot chain line indicates a case where the bypass VSV 202 has the closed-side fixation abnormality, and a broken line indicates a case where the bypass VSV 202 has the open-side fixation abnormality. In FIG. 8D, a solid line indicates a case where no membrane hole is formed in the bladder diaphragm 42, and a broken line indicates a case where a membrane hole is formed in the bladder diaphragm 42.

In this embodiment, when the engine 20 is started to operate at a time point t10 indicated in FIGS. 8A to 8E, a negative pressure is led into the evaporative system. If in this state, the CCV 206 is closed (at a time point t11 in FIGS. 8A to 8E) in order to execute the evaporative system hole detection, the introduction of fresh air from the intake passage 50 through the introduction passage 48 into the air chamber 46 does not occur, so that the passage internal pressure $P_{BP}$ in the bypass VSV 202 increases to the negative pressure side. Then, when the passage internal pressure $P_{BP}$ reaches a predetermined negative pressure (−20 mmHg in FIG. 8A) (at a time point t12 in FIGS. 8A to 8E), the purge VSV 84 is set to the completely closed state. In this case, since both the CCV 206 and the purge VSV 84 are set to the closed valve state, the evaporative system becomes tightly closed.

If no hole is formed in the evaporative system, the passage internal pressure $P_{BP}$, after the evaporative system has been tightly closed, gradually increases to the positive pressure side due to evaporation of fuel present in the evaporative system. Conversely, if a hole is formed in the evaporative system, the atmosphere flows in via the hole, so that the passage internal pressure $P_{BP}$ rapidly increases toward the atmospheric pressure. Therefore, by detecting a change in the passage internal pressure $P_{BP}$ after the evaporative system has been tightly closed, it becomes possible to detect a hole in the evaporative system. In this embodiment, therefore, the evaporative system hole detection is performed based on a change in the passage internal pressure $P_{BP}$ occurring after the evaporative system has been tightly closed.

If it is determined by the evaporative system hole detection that no hole is formed in the evaporative system, the supply of the drive signals to the CCV 206 and the purge VSV 84 is stopped and the supply of the drive signal to the bypass VSV 202 is started at a time point t13 in order to end the evaporative system hole detection and start the bladder diaphragm hole detection. When no hole is formed in the evaporative system, the passage internal pressure $P_{BP}$ is substantially kept at a great negative pressure. Therefore, when the CCV 206 is opened in that condition, fresh air is led from the intake passage 50 into the evaporative system via the introduction passage 48.

When the bypass VSV 202 normally functions, the intake passage 50 and the air chamber 46 are directly interconnected via the bypass passage 200 upon supply of the drive signal to the bypass VSV 202. If the vapor concentration correction factor FGPG becomes a value near "0" as indicated by the solid line in FIG. 8D after the intake passage 50 and the air chamber 46 have been directly connected via the bypass passage 200, it is determined that no membrane hole is formed in the bladder diaphragm 42. Conversely, if the vapor concentration correction factor FGPG increases to the negative side as indicated by the broken line in FIG. 8D, it is determined that a membrane hole has been formed in the bladder diaphragm 42.

Subsequently at a time point t14, the supply of the drive signal to the bypass VSV 202 is stopped when the bladder diaphragm hole detection is to be ended. If the bypass VSV 202 normally functions, the intake passage 50 and the air chamber 46 are interconnected via the canister 78 upon the stop of the supply of the drive signal to the bypass VSV 202. In this case, fuel adsorbed in the canister 78 is purged toward the intake passage 50 again.

The bypass passage 200 has an inside diameter that is smaller than the inside diameter of the gas passage 86 as mentioned above. Therefore, in a condition where the CCV 206 and the purge VSV 84 are both open and therefore fresh air is introduced into the evaporative system, the passage internal pressure $P_{BP}$ converges to different values when the intake passage 50 and the air chamber 46 are connected via the bypass passage 200 and when the intake passage 50 and the air chamber 46 are connected via the canister 78. More specifically, when the intake passage 50 and the air chamber 46 are connected via the canister 78, the passage internal pressure $P_{BP}$ converges to a value near the atmospheric pressure due to an effect of fresh air flowing into the evaporative system. On the other hand, when the intake passage 50 and the air chamber 46 are connected via the bypass passage 200, the passage internal pressure $P_{BP}$ converges to a great value on the negative side due to an effect of the negative pressure at the side of the surge tank 82.

Therefore, if the passage internal pressure $P_{BP}$ converges to a great value on the negative pressure side when the drive signal is supplied to the bypass VSV 202 so as to directly connect the intake passage 50 and the air chamber 46, it can be considered that the bypass VSV 202 is normally functioning. If the passage internal pressure $P_{BP}$ converges to a small value on the negative pressure side in the aforementioned case, it can be considered that the bypass VSV 202 has the closed-side fixation abnormality.

If the passage internal pressure $P_{BP}$ converges to a small value on the negative pressure side when the supply of the drive signal to the bypass VSV 202 is stopped so as to connect the intake passage 50 and the canister 78, it can be considered that the bypass VSV 202 is normally functioning. If the passage internal pressure $P_{BP}$ remains at a great value on the negative pressure side in that case, it can be considered that the bypass VSV 202 has the open-side fixation abnormality.

Therefore, in this embodiment, after the time point t13 when the supply of the drive signals to the CCV 206 and the purge VSV 84 is stopped and the supply of the drive signal to the bypass VSV 202 is started in order to end the evaporative system hole detection and start the bladder diaphragm hole detection, it is determined whether the bypass VSV 202 has the closed-side fixation abnormality based on the passage internal pressure $P_{BP}$ occurring in the bypass passage 200 from that time on. If the passage internal pressure $P_{BP}$ converges to a great value on the negative pressure side as indicated by the solid line in FIG. 8A after the time point t13, it is determined that the bypass VSV 202 is normally functioning. If the passage internal pressure $P_{BP}$ converges to a small value on the negative pressure side as indicated by the one-dot chain line in FIG. 8A after the time point t13, it is determined that the bypass VSV 202 has the closed-side fixation abnormality.

After a time point t14 when the supply of the drive signal to the bypass VSV 202 is stopped to end the bladder diaphragm hole detection, it is determined whether the bypass VSV 202 has the open-side fixation abnormality based on the passage internal pressure $P_{BP}$ occurring in the bypass passage 200 from that time on. If the passage internal pressure $P_{BP}$ converges to a small value on the negative pressure side as indicated by the solid line in FIG. 8A after the time point t14, it is determined that the bypass VSV 202 is normally functioning. If the passage internal pressure $P_{BP}$ converges to a great value on the negative pressure side as indicated by the broken line, it is determined that the bypass VSV 202 has the open-side fixation abnormality.

Thus, this embodiment is able to make determination regarding both the closed-side fixation abnormality and the open-side fixation abnormality of the bypass VSV 202. Therefore, according to this embodiment, too, it becomes possible to prevent false determination regarding the presence/absence of a hole in the bladder diaphragm 42 attributed to an abnormality of the bypass VSV 202.

In the above-described second embodiment, the gas passage 86 corresponds to "a main passage" described in the appended claims of this application. The bypass VSV 202 corresponds to "changing means" described in the claims. The ECU 10, detecting the passage internal pressure $P_{BP}$ in the bypass passage 200 based on the output signal of the pressure sensor 204, realizes "pressure detecting means" described in the claims. The ECU 10, determining whether the bypass VSV 202 has a fixation abnormality based on the passage internal pressure $P_{BP}$, realizes "abnormality determining means" described in the claims.

Although the second embodiment determines only whether the bypass VSV 202 has a fixation abnormality, it is also possible to determine that the bypass passage 200 has a clogged abnormality if the passage internal pressure $P_{BP}$ in the bypass passage 200 converges to a value near the atmospheric pressure from the time point t13 on. If the bypass passage 200 has the clogged abnormality, the fuel tank 40 is not connected in communication to the surge tank 82—side of the intake passage 50, but is connected in communication only to the air cleaner 52—side of the intake passage 50. In this case, the pressure in the evaporative system rises toward the atmospheric pressure. Therefore, if the passage internal pressure $P_{BP}$ in the bypass passage 200 converges to a value near the atmospheric pressure, it can be determined that the bypass passage 200 has the clogged abnormality.

Furthermore, although the second embodiment makes determinations regarding the closed-side fixation abnormality and the open-side fixation abnormality of the bypass VSV 202 based on the passage internal pressure $P_{BP}$ occurring before and after the supply of the drive signal to the bypass VSV 202, it is also possible to make such determinations based on the amplitude or extent of variations of the passage internal pressure $P_{BP}$.

A third embodiment of the invention will next be described with reference to FIG. 7 and FIGS. 9A to 9E and FIG. 10.

The above-described first embodiment forcibly keeps the engine revolution speed NE, the throttle opening degree TA, and the duty ratio of the drive signal to the purge VSV 84 at constant values at the time of determination regarding an abnormality of the bypass system. In this case, a constant amount of purge flow from the air chamber 46 to the intake passage 50 is maintained before and after the supply of the drive signal to the bypass VSV 90, so that at the time of determination regarding an abnormality of the bypass system, there is no fluctuation in the tank internal pressure $P_{TNK}$ attributed to a change in the operational state of the engine 20 or the like. Therefore, based on the tank internal pressure $P_{TNK}$, the abnormality determination can be performed with good precision and accuracy.

In contrast, this embodiment does not forcibly fix the engine revolution speed NE or the like at the time of determination regarding an abnormality of the bypass system. Instead, the embodiment executes the determination regarding an abnormality of the bypass system based on the passage internal pressure $P_{BP}$ occurring under a condition where the amount of purge flow from the air chamber 46 to the intake passage 50 after the supply of the drive signal to the bypass VSV 202 is kept constant in comparison with the amount of purge flow occurring before the supply of the drive signal.

Figure 9A:
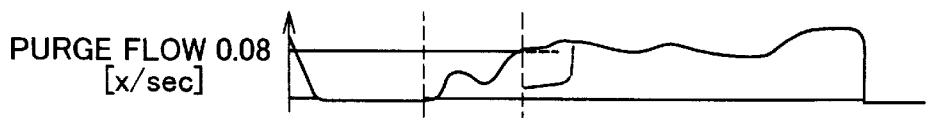
FIGS. 9A to 9E are time charts for illustrating operations performed in conjunction with determination regarding the closed-side fixation abnormality of the bypass VSV in a system in accordance with a third embodiment of the invention.
Figure 9B:
Figure 9C:
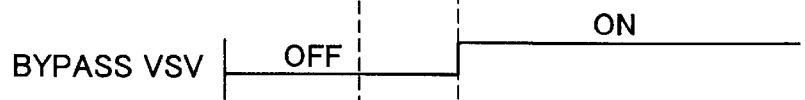
Figure 9D:
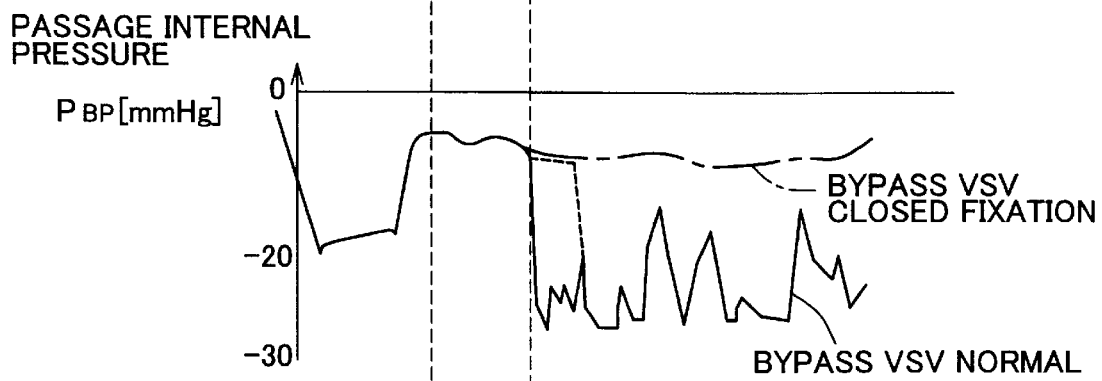
Figure 9E:
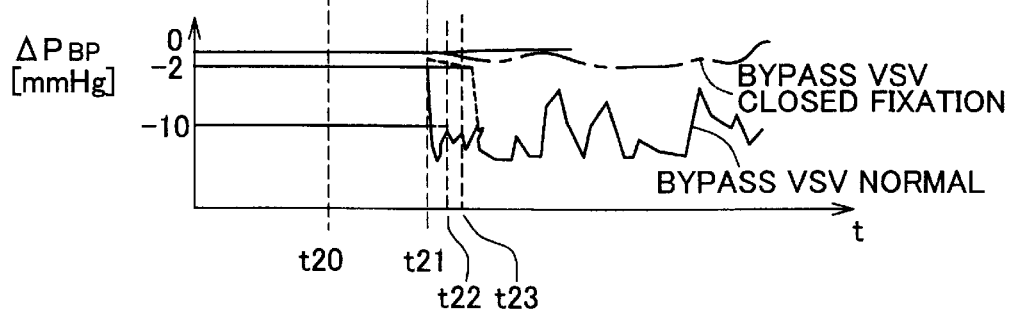

FIGS. 9A to 9E are time charts for illustrating operations performed in conjunction with determination regarding the closed-side fixation abnormality of the bypass VSV 202. FIGS. 9A to 9E are time charts regarding the amount of purge flow from the air chamber 46 to the intake passage 50, the on/off status of a flag indicating establishment of a bladder diaphragm hole determination executing condition, the on/off state of the bypass VSV 202, the passage internal pressure $P_{BP}$, and the differential pressure $\Delta P_{BP}$ ($P_{BP}$(after)–$P_{BP}$(before)) of the passage internal pressures $P_{BP}$ before and after the supply of the drive signal to the bypass VSV 202, respectively. In FIGS. 9A, 9D and 9E, broken lines indicate a case where the amount of purge flow decreases after the bladder diaphragm hole detection executing condition is met. In FIGS. 9D and 9E, solid lines indicate a case where the bypass VSV 202 is normal, and one-dot chain lines indicate a case where the bypass VSV 202 has the closed-side fixation abnormality.

After the evaporative system hole detection ends, the CCV 206 and the purge VSV 84 are opened, so that the air chamber 46 of the fuel tank 40 is connected in communication to the intake passage 50 via the introduction passage 48 and the purge passage 80. In this case, fresh air is led into the evaporative system, and gas is purged from the air chamber 46 to the intake passage 50 via the gas passage 86, the canister 78, and the purge passage 80. When air is led into the evaporative system in the tightly closed state under a condition that the air chamber 46 and the intake passage 50 are connected in communication via the gas passage 86, the passage internal pressure $P_{BP}$ rises toward a value corresponding to the flow passage resistance of the canister 78.

Subsequently, at a time point t20 when the passage internal pressure $P_{BP}$ reaches the value corresponding to the flow passage resistance of the canister 78 and the purge of gas from the air chamber 46 to the intake passage 50 is started, it is determined whether the bladder diaphragm hole detection executing condition is met in order to start the bladder diaphragm hole detection if it has been determined by the evaporative system hole detection that the evaporative system has no hole. The bladder diaphragm hole detection executing condition is met when the amount of purge flow (purge flow rate) from to the air chamber 46 to the intake passage 50 reaches or exceeds a constant value (e.g., 0.08 g/sec) after it has been determined that the evaporative system has no hole. If the bladder diaphragm hole detection executing condition is met at a time point t21, the drive signal is supplied to the bypass VSV 202 so as to connect the air chamber 46 and the intake passage 50 in communication via the bypass passage 200.

If the bypass VSV 202 does not have the closed-side fixation abnormality, the air chamber 46 and the intake passage 50 are connected in communication via the bypass passage 200 upon supply of the drive signal to the bypass VSV 202. The bypass passage 200 is designed so that the inside diameter thereof is smaller than the inside diameter of the gas passage 86, and so that the capacity thereof is considerably smaller than the capacity of the air chamber 46 of the fuel tank 40, as mentioned above. Therefore, under a condition that after the drive signal is supplied to the bypass VSV 202 following establishment of the bladder diaphragm hole detection executing condition, the amount of purge flow from the air chamber 46 to the intake passage 50 is kept at or above a predetermined value, the internal pressure in the bypass passage 200 is quickly reduced toward a negative pressure occurring in the surge tank 82, immediately after the communication passage between the air chamber 46 and the intake passage 50 is changed from the gas passage 86 to the bypass passage 200. That is, the passage internal pressure $P_{BP}$ considerably fluctuates before and after the supply of the drive signal to the bypass VSV 202, as indicated by the solid line in FIG. 9D. It should be noted herein that after the drive signal is supplied to the bypass VSV 202, the internal pressure in the air chamber 46 gradually decreases although the internal pressure in the bypass passage 200 quickly decreases.

Conversely, if the bypass VSV 202 has the closed-side fixation abnormality, the air chamber 46 and the intake passage 50 are not connected in communication via the bypass passage 200 but continue to be in the state of communication via the gas passage 86 even though the drive signal is supplied to the bypass VSV 202. Therefore, although the communication passage between the air chamber 46 and the intake passage 50 is changed from the gas passage 86 to the bypass passage 200, the internal pressure in the bypass passage 200 is not reduced toward the negative pressure occurring in the surge tank 82, but is kept at the present value. That is, the passage internal pressure $P_{BP}$ hardly fluctuates as indicated by the one-dot chain line in FIG. 9D before and after the supply of the drive signal to the bypass VSV 202.

Therefore, by comparing the passage internal pressure $P_{BP}$ occurring after the supply of the drive signal to the bypass VSV 202 with the passage internal pressure $P_{BP}$ occurring before the supply of the drive signal thereto, it can be determined whether the bypass VSV 202 has the closed-side fixation abnormality.

More specifically, the following fashion of determination is conceivable. That is, it is determined that the bypass VSV 202 is normally functioning if the passage internal pressure $P_{BP}$ is reduced below a first predetermined value (e.g., if $\Delta P_{BP} < -10$ mmHg holds) at the time point (time point t22 in FIGS. 9A to 9E) of elapse of a predetermined length of time (e.g., 0.7 s) following the time point t21 of the supply of the drive signal to the bypass VSV 202. Conversely, if the passage internal pressure $P_{BP}$ does not decrease to or below a second predetermined value (e.g., if $\Delta P_{BP} > -2$ mmHg holds) at the time point (time point t23 in FIGS. 9A to 9E) of elapse of a second predetermined length of time (e.g., 1.0 s) following the time point t21 of the supply of the drive signal to the bypass VSV 202, it is determined that the bypass VSV 202 has the closed-side fixation abnormality.

However, if the determination regarding the closed-side fixation abnormality of the bypass VSV 202 is performed based on the passage internal pressure $P_{BP}$ within a predetermined length of time following the supply of the drive signal to the bypass VSV 202 as described above, a problem may arise in a case where the amount of purge flow from the air chamber 46 to the intake passage 50 cannot be kept at or above a predetermined value after the supply of the drive signal to the bypass VSV 202 following establishment of the bladder diaphragm hole detection executing condition.

That is, if the amount of purge flow from the air chamber 46 to the intake passage 50 becomes small after the supply of the drive signal to the bypass VSV 202, the passage internal pressure $P_{BP}$ becomes a value near the atmospheric pressure, so that the difference between the flow passage resistance of the canister 78 and the flow passage resistance of the bypass passage 200 does not clearly appear in the passage internal pressure $P_{BP}$. In this case, since the passage internal pressure $P_{BP}$ does not decrease within a predetermined length of time as indicated by the broken line in FIGS. 9A to 9E following the supply of the drive signal to the bypass VSV 202 even though the bypass VSV 202 is normal, it is impossible to discriminate whether the passage internal pressure $P_{BP}$ assuming a value near the atmospheric pressure is attributed to a reduction in the amount of purge flow from the air chamber 46 to the intake passage 50 or to the closed-side fixation abnormality of the bypass VSV 202. Therefore, if the determination as to whether the bypass VSV 202 has the closed-side fixation abnormality is performed based on the passage internal pressure $P_{BP}$ occurring within a predetermined length of time following the supply of the drive signal to the bypass VSV 202 as described above, there is a danger that although the bypass VSV 202 is normal, it may be falsely determined that the bypass VSV 202 has the closed-side fixation abnormality.

Therefore, in order to accurately determine whether the bypass VSV 202 has the closed-side fixation abnormality, it is not appropriate to perform the abnormality determination based on the passage internal pressure $P_{BP}$ occurring within the fixed predetermined length of time following the supply of the drive signal to the bypass VSV 202, but it is appropriate to perform the abnormality determination based on the passage internal pressure $P_{BP}$ occurring under a condition where a state in which the amount of purge flow from the air chamber 46 to the intake passage 50 is at least a fixed value continues for a certain length of time, so that the difference between the flow passage resistance of the canister 78 and the flow passage resistance of the bypass passage 200 can reliably appear in the passage internal pressure $P_{BP}$.

Therefore, the system of this embodiment is characterized in that after the drive signal is supplied to the bypass VSV 202, the bypass system abnormality determination is performed under a condition where the difference between the flow passage resistance of the canister 78 and the flow passage resistance of the bypass passage 200 occurring when gas flows from the air chamber 46 to the intake passage 50 will reliably appear, in order to accurately determine whether the bypass VSV 202 has the closed-side fixation abnormality.

Figure 10:
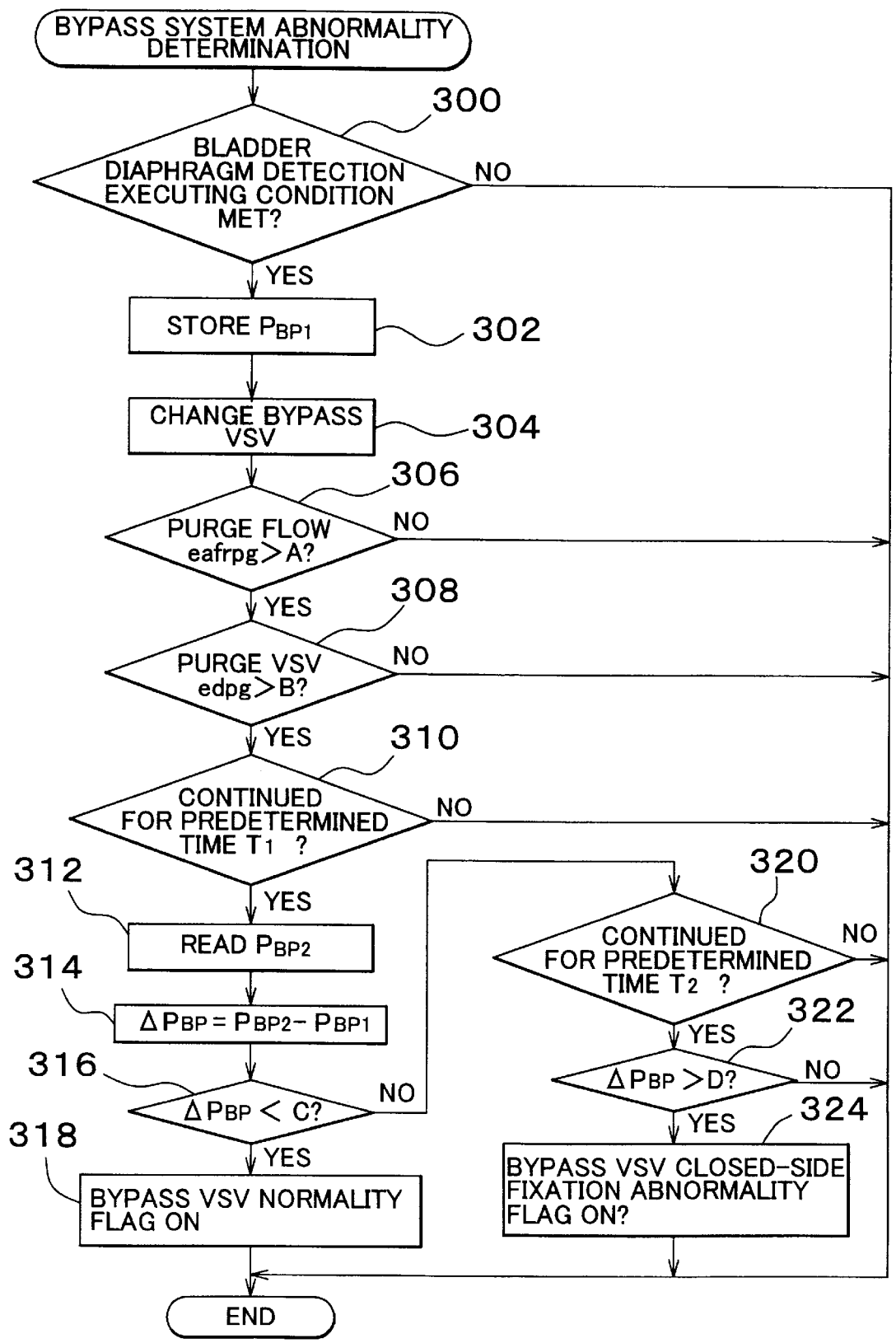
FIG. 10 is a flowchart exemplifying a control routine executed to determine whether the bypass system has an abnormality in the embodiment.

FIG. 10 is a flowchart illustrating a control routine executed by the ECU 10 in this embodiment so as to determine whether the bypass VSV 202 has the closed-side fixation abnormality. The routine in FIG. 10 is a routine started every time the process thereof ends. When the routine illustrated in FIG. 10 is started, the process of step 300 is first executed.

In step 300, the ECU 10 determines whether the bladder diaphragm hole detection executing condition is met. This executing condition is met if the amount of purge flow (purge flow rate) from the air chamber 46 to the intake passage 50 reaches or exceeds a fixed value (e.g., 0.08 g/sec) after it has been determined by the evaporative system hole detection that the evaporative system has no hole. If it is determined that the bladder diaphragm hole detection executing condition is not met, the ECU 10 ends the present execution of the routine without executing any further process. Conversely, if it is determined that the executing condition is met, the ECU 10 subsequently executes a process of step 302.

In step 302, the ECU 10 executes a process of storing the passage internal pressure $P_{BP}$ occurring at the time of executing the step 300 as a passage internal pressure $P_{BP1}$ occurring before the supply of the drive signal to the bypass VSV 202.

Subsequently in step 304, the ECU 10 executes a process of supplying the drive signal to the bypass VSV 202. After the process of step 304 is executed, the air chamber 46 and the intake passage 50 are connected in communication via the bypass passage 200 bypassing the canister 78 if the bypass VSV 202 normally functions.

Subsequently in step 306, the ECU 10 determines whether the amount of purge flow eafrpg from the air chamber 46 to the intake passage 50 is greater than a predetermined value A (e.g., 0.06 g/sec). The amount of purge flow eafrpg is determined based on the engine revolution speed NE, the amount of intake air Ga, the purge rate, etc., with reference to a predetermined map. If it is determined that eafrpg>A does not hold, the ECU 10 ends the present execution of the routine. Conversely, if it is determined that eafrpg>A holds, the ECU 10 subsequently executes a process of step 308.

In step 308, the ECU 10 determines whether the duty ratio edpg of the drive signal to the purge VSV 84 is greater than a predetermined value B (e.g., 15%). If it is determined that edpg>B does not hold, the ECU 10 ends the present execution of the routine. Conversely, if it is determined that edpg>B holds, the ECU 10 subsequently executes a process of step 310.

In step 310, the ECU 10 determines whether a state where both conditions of steps 306 and 308 are met has continued for a first predetermined length of time T1 (e.g., 0.7 s).

If it is determined that the aforementioned state has not continued for the first predetermined length of time T1, the ECU 10 ends the present execution of the routine. Conversely, if it is determined that the aforementioned state has continued for the first predetermined length of time T1, the ECU 10 subsequently executes a process of step 312.

In step 312, the ECU 10 executes a process of reading or inputting the passage internal pressure $P_{BP}$ occurring at the time when the state where both conditions of steps 306 and 308 are met has continued for the first predetermined length of time T1 as a passage internal pressure $P_{BP2}$ occurring after the supply of the drive signal to the bypass VSV 202.

Subsequently in step 314, the ECU 10 executes a process of calculating a differential pressure $\Delta P_{BP}$ between $P_{BP2}$ read in step 312 and $P_{BP1}$ stored in step 302 ($\Delta P_{BP}=P_{BP2}-P_{BP1}$).

Subsequently in step 316, the ECU 10 determines whether the differential pressure $\Delta P_{BP}$ calculated in step 314 is smaller than a first threshold C (e.g., −10 mmHg). The first threshold C is a minimum amount of change in the passage internal pressure $P_{BP}$ that allows a determination that the passage internal pressure $P_{BP}$ changes before and after the supply of the drive signal to the bypass VSV 202 under a condition that the bypass VSV 202 is normal.

If $\Delta P_{BP}<C$ holds, it can be considered that the passage internal pressure $P_{BP}$ has greatly decreased by an amount that is greater than the predetermined value before and after the supply of the drive signal to the bypass VSV 202. In this case, it can be considered that due to the driving of the bypass VSV 202, the air chamber 46 and the intake passage 50 are interconnected in communication via the bypass passage 200. As a result, if that determination is made, the ECU 10 subsequently executes a process of step 318. Conversely, if it is determined that $\Delta P_{BP}<C$ does not hold, the ECU 10 subsequently executes a process of step 320.

In step 318, the ECU 10 executes a process of setting up a flag that indicates that the bypass VSV 202 is normally functioning. After the process of step 318 is executed, the bladder diaphragm hole detection is executed assuming that the bypass VSV 202 is normal. After the process of step 318 ends, the ECU 10 ends the present execution of the routine.

In step 320, the ECU 10 determines whether the state where both conditions of steps 306 and 308 has continued for a second predetermined length of time T2 (e.g., 1.0 s). The second predetermined length of time T2 is set longer than the first predetermined length of time T1. If the aforementioned state has not continued for the second predetermined length of time T2, the ECU 10 ends the present execution of the routine. Conversely, if the aforementioned state has continued for the second predetermined length of time T2, the ECU 10 subsequently executes a process of step 322.

In step 322, the ECU 10 determines whether the $\Delta P_{BP}$ calculated in step 314 is greater than a second threshold D (e.g., −2 mmHg). The second threshold D is a maximum amount of change in the passage internal pressure $P_{BP}$ that makes it possible to consider that the passage internal pressure $P_{BP}$ cannot change before and after the supply of the drive signal to the bypass VSV 202 under a condition that the bypass VSV 202 has the closed-side fixation abnormality. The second threshold D is set greater than the first threshold C.

If $\Delta P_{BP}>D$ does not hold, it can be considered that the passage internal pressure $P_{BP}$ has decreased to some extent before and after the supply of the drive signal to the bypass VSV 202. In this case, it cannot be considered that the bypass VSV 202 has the closed-side fixation abnormality.

Therefore, if that determination is made, the ECU 10 ends the present execution of the routine. Conversely, if $\Delta P_{BP} > D$ holds, it can be considered that the passage internal pressure $P_{BP}$ has hardly decreased before and after the supply of the drive signal to the bypass VSV 202. In this case, it can be considered that the state where the air chamber 46 and the intake passage 50 are connected in communication via the gas passage 86 and the canister 78 has continued despite the supply of the drive signal to the bypass VSV 202. Therefore, if that determination is made, the ECU 10 subsequently executes a process of step 324.

In step 324, the ECU 10 executes a process of setting up a flag that indicates that the bypass VSV 202 has the closed-side fixation abnormality. When this flag is set, it is also possible to produce an alarm or turn on an alarm lamp so as to inform an occupant in the vehicle of the fixation abnormality of the bypass VSV 90. It is also possible to activate the alarm or the alarm lamp if the flag is set successively twice or more times. After the process of step 324, the ECU 10 ends the present execution of the routine.

Through the above-description processes, it can be determined whether the bypass VSV 202 has the closed-side fixation abnormality by comparing the passage internal pressure $P_{BP}$ occurring after a state where the amount of purge flow from the air chamber 46 to the intake passage 50 is great has continued for a relatively long time following the supply of the drive signal to the bypass VSV 202 based on the establishment of the bladder diaphragm hole detection executing condition and the passage internal pressure $P_{BP}$ occurring before the supply of the drive signal to the bypass VSV 202. In this case, the determination regarding the closed-side fixation abnormality of the bypass VSV 202 is not performed based on the passage internal pressure $P_{BP}$ occurring under a condition that the amount of purge flow is small after the supply of the drive signal to the bypass VSV 202. Instead, the determination regarding the closed-side fixation abnormality of the bypass VSV 202 is performed based on the passage internal pressure $P_{BP}$ occurring under a condition that the amount of purge flow is relatively great.

Therefore, this embodiment is able to prevent false determination regarding the closed-side fixation abnormality of the bypass VSV 202 caused by a reduction in the amount of purge flow after the supply of the drive signal to the bypass VSV 202, and is able to accurately determine the abnormality. Therefore, the system of the embodiment allows an improvement in the precision of determination regarding the closed-side fixation abnormality of the bypass VSV 202.

In the above-described third embodiment, it is determined whether the bypass VSV 202 is normally functioning by using the passage internal pressure $P_{BP}$ occurring at the time point when a state where the amount of purge flow is greater than the predetermined value A and where the duty ratio regarding the purge VSV 84 is greater than the predetermined value B has continued for the first predetermined length of time T1, and by using that passage internal pressure $P_{BP}$ as a basis for the determination. However, this invention is not restricted by the embodiment. It is also possible to determine whether the bypass VSV 202 is normally functioning based on whether there is a period during which the differential pressure $\Delta P_{BP}$ of passage internal pressures $P_{BP}$ occurring before and after the supply of the drive signal to the bypass VSV 202 is smaller than the first threshold C, during the elapse of a predetermined length of time with a state where the amount of purge flow is greater than the predetermined value A and where the duty ratio regarding the purge VSV 84 is greater than the predetermined value B, after the drive signal has been supplied to the bypass VSV 202.

Furthermore, in the third embodiment, it is determined whether the bypass VSV 202 has the closed-side fixation abnormality based on the passage internal pressure $P_{BP}$ occurring after the supply of the drive signal to the bypass VSV 202. However, a changing tendency obtained by right-to-left inversion of that indicated in FIG. 9D appears in the passage internal pressure $P_{BP}$ even after the supply of the drive signal to the bypass VSV 202 is stopped. Therefore, it is also possible to determine whether the bypass VSV 202 has the closed-side fixation abnormality based on the passage internal pressure $P_{BP}$ occurring at the time of stopping the supply of the drive signal to the bypass VSV 202.

Furthermore, the third embodiment is applied to a construction as shown in FIG. 7 in which the determination regarding the closed-side fixation abnormality of the bypass VSV 202 is performed based on the passage internal pressure $P_{BP}$ in the bypass passage 200. However, it is also possible to apply the embodiment to a system in which the determination regarding an abnormality in the bypass system is performed based on the tank internal pressure $P_{TNK}$ in the fuel tank 40.

That is, in the construction shown in FIG. 2, it is determined that the bypass passage 88 has the clogged abnormality, if the tank internal pressure $P_{TNK}$, after the supply of the drive signal to the bypass VSV 90, becomes a value near the atmospheric pressure. Furthermore, if the flow passage resistance of the bypass passage 88 is greater than the flow passage resistance of the canister 78, the tank internal pressure $P_{TNK}$, after the supply of the drive signal to the bypass VSV 90, changes toward the atmospheric pressure. If the amount of purge flow from the air chamber 46 to the intake passage 50 decreases after the supply of the drive signal to the bypass VSV 90, the tank internal pressure $P_{TNK}$ becomes a value near the atmospheric pressure corresponding to the amount of purge flow. Therefore, there is a danger that although the bypass passage 88 does not have the clogged abnormality, it may be falsely determined that the clogged abnormality has occurred, or a danger that although the bypass VSV 90 has a fixation abnormality, it may be falsely determined that the bypass VSV 90 is normal. Therefore, if the engine revolution speed NE and the like are not forcibly fixed at the time of abnormality determination regarding the bypass system in the construction shown in FIG. 2, it is appropriate to determine whether the bypass system has an abnormality based on the tank internal pressure $P_{TNK}$ occurring at the time point when the state where the amount of purge flow from the air chamber 46 to the intake passage 50 is relatively great has continued for a relatively long time after the drive signal has been supplied to the bypass VSV 90, as in the third embodiment.

Furthermore, in the third embodiment, it is determined whether the bypass VSV 202 is normal or has the closed-side fixation abnormality based on the passage internal pressure $P_{BP}$ occurring when the state where the amount of purge flow is greater than the predetermined value A has continued for the first or second predetermined length of time T1, T2 following the supply of the drive signal to the bypass VSV 202. However, it is also possible to determine whether the bypass VSV 202 is normal or has the closed-side fixation abnormality based on the passage internal pressure $P_{BP}$ occurring when the accumulated time during which the state where the amount of purge flow is greater than the predetermined value A is realized reaches the first or second predetermined length of time T1, T2. In this case, it becomes possible to determine whether the bypass VSV 202 is normal or has the closed-side fixation abnormality as soon as possible after the supply of the drive signal to the bypass VSV 202. The aforementioned accumulated time is increased by addition when the amount of purge flow is greater than the predetermined value A, and is suspended or maintained when the amount of purge flow is equal to or less than the predetermined value A. However, it is also possible to decrease by subtraction or reset the accumulated time when the amount of purge flow becomes equal to or less than a predetermined value B that is smaller than the predetermined value A.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. An abnormality diagnostic apparatus of a fuel vapor purge system, comprising:
    a fuel tank connectable in communication to an atmosphere;
    a main passage connecting the fuel tank and an intake passage of an internal combustion engine via a canister for adsorbing a fuel vapor from the fuel tank;
    a bypass passage connecting the fuel tank and the intake passage, bypassing the canister;
    changing means for selectively changing between the main passage and the bypass passage;
    pressure detecting means for detecting a pressure in the fuel tank; and
    abnormality determining means for determining whether there is an abnormality in at least one of the bypass passage and the changing means based on the pressure detected by the pressure detecting means before and after an operation of changing between the main passage and the bypass passage is performed while air is flowing from the fuel tank toward the intake passage.

2. An abnormality diagnostic apparatus according to claim 1, wherein the abnormality determining means determines whether there is an abnormality in at least one of the bypass passage and the changing means based on the pressure detected by the pressure detecting means under a condition where a difference between a flow passage resistance of the main passage and a flow passage resistance of the bypass passage is allowed to appear, after the operation of changing the communication passage is performed by the changing means.

3. An abnormality diagnostic apparatus according to claim 2, wherein the abnormality determining means determines whether there is an abnormality in at least one of the bypass passage and the changing means based on the pressure detected by the pressure detecting means at a time point when a state where an amount of flow of air from the fuel tank to the intake passage is at least a predetermined value continues for a predetermined length of time after the operation of changing the communication passage is performed by the changing means.

4. An abnormality diagnostic apparatus according to claim 2, wherein the abnormality determining means determines whether there is an abnormality in at least one of the bypass passage and the changing means based on whether there is a period during which an absolute value of an amount of change in the pressure detected by the pressure detecting means becomes at least a predetermined amount while a state where an amount of flow of air from the fuel tank to the intake passage is at least a predetermined value continues for a predetermined length of time after the operation of changing the communication passage is performed by the changing means.

5. An abnormality diagnostic apparatus according to claim 1, wherein the abnormality determining means determines that the bypass passage has a clogged abnormality if the pressure detected by the pressure detecting means becomes substantially equal to an atmospheric pressure after the communication passage is changed to the bypass passage by the changing means.

6. An abnormality diagnostic apparatus according to claim 1, wherein the abnormality determining means determines that the changing means has an abnormality if an absolute value of an amount of change from the pressure detected by the pressure detecting means before the operation of changing the communication passage is performed by the changing means to the pressure detected by the pressure detecting means after the operation of changing the communication passage is performed is at most a predetermined value.

7. An abnormality diagnostic apparatus according to claim 1, wherein the abnormality diagnostic apparatus determines whether there is an abnormality in at least one of the bypass passage and the changing means based on an extent of variation of the pressure detected by the pressure detecting means before and after the operation of changing the communication passage is performed by the changing means.

8. An abnormality diagnostic apparatus according to claim 1, wherein the internal combustion engine is kept in a predetermined operational state when a state of at least one of the bypass passage and the changing means is determined by the abnormality determining means.

9. An abnormality diagnostic apparatus of a fuel vapor purge system, comprising:
    a fuel tank connectable in communication to an atmosphere;
    a main passage connecting the fuel tank and an intake passage of an internal combustion engine via a canister for adsorbing a fuel vapor from the fuel tank;
    a bypass passage connecting the fuel tank and the intake passage, bypassing the canister;
    changing means for selectively changing between the main passage and the bypass passage;
    pressure detecting means for detecting a pressure in the bypass passage; and
    abnormality determining means for determining whether there is an abnormality in at least one of the bypass passage and the changing means based on the pressure detected by the pressure detecting means before and after an operation of changing between the main passage and the bypass passage is performed while air is flowing from the fuel tank toward the intake passage.

10. An abnormality diagnostic apparatus according to claim 9, wherein the abnormality determining means determines whether there is an abnormality in at least one of the bypass passage and the changing means based on the pressure detected by the pressure detecting means under a condition where a difference between a flow passage resistance of the main passage and a flow passage resistance of the bypass passage is allowed to appear, after the operation of changing the communication passage is performed by the changing means.

11. An abnormality diagnostic apparatus according to claim 10, wherein the abnormality determining means determines whether there is an abnormality in at least one of the bypass passage and the changing means based on the pressure detected by the pressure detecting means at a time point when a state where an amount of flow of air from the fuel tank to the intake passage is at least a predetermined value continues for a predetermined length of time after the operation of changing the communication passage is performed by the changing means.

12. An abnormality diagnostic apparatus according to claim 10, wherein the abnormality determining means determines whether there is an abnormality in at least one of the bypass passage and the changing means based on whether there is a period during which an absolute value of an amount of change in the pressure detected by the pressure detecting means becomes at least a predetermined amount while a state where an amount of flow of air from the fuel tank to the intake passage is at least a predetermined value continues for a predetermined length of time after the operation of changing the communication passage is performed by the changing means.

13. An abnormality diagnostic apparatus according to claim 9, wherein the abnormality determining means determines that the bypass passage has a clogged abnormality if the pressure detected by the pressure detecting means becomes substantially equal to an atmospheric pressure after the communication passage is changed to the bypass passage by the changing means.

14. An abnormality diagnostic apparatus according to claim 9, wherein the abnormality determining means determines that the changing means has an abnormality if an absolute value of an amount of change from the pressure detected by the pressure detecting means before the operation of changing the communication passage is performed by the changing means to the pressure detected by the pressure detecting means after the operation of changing the communication passage is performed is at most a predetermined value.

15. An abnormality diagnostic apparatus according to claim 9, wherein the abnormality diagnostic apparatus determines whether there is an abnormality in at least one of the bypass passage and the changing means based on an extent of variation of the pressure detected by the pressure detecting means before and after the operation of changing the communication passage is performed by the changing means.

16. An abnormality diagnostic apparatus according to claim 9, wherein the internal combustion engine is kept in a predetermined operational state when a state of at least one of the bypass passage and the changing means is determined by the abnormality determining means.

17. An abnormality diagnostic method for a fuel vapor purge system, having a fuel tank connectable in communication to an atmosphere, a main passage connecting the fuel tank and an intake passage of an internal combustion engine via a canister for adsorbing a fuel vapor from the fuel tank, a bypass passage connecting the fuel tank and the intake passage, bypassing the canister, changing means for selectively changing between the main passage and the bypass passage, and pressure detecting means for detecting a pressure in the fuel tank, the method comprising the steps of:

detecting the pressure in the fuel tank before and after an operation of changing between the main passage and the bypass passage is performed while air is flowing from the fuel tank toward the intake passage; and determining whether there is an abnormality in at least one of the bypass passage and the changing means based on the detected pressure.

18. An abnormality diagnostic method for a fuel vapor purge system, having a fuel tank connectable in communication to an atmosphere, a main passage connecting the fuel tank and an intake passage of an internal combustion engine via a canister for adsorbing a fuel vapor from the fuel tank, a bypass passage connecting the fuel tank and the intake passage, bypassing the canister, changing means for selectively changing between the main passage and the bypass passage, and pressure detecting means for detecting a pressure in the bypass passage, the method comprising the steps of:

detecting the pressure in the bypass passage before and after an operation of changing between the main passage and the bypass passage is performed while air is flowing from the fuel tank toward the intake passage; and determining whether there is an abnormality in at least one of the bypass passage and the changing means based on the detected pressure.

* * * * *